United States Patent
Aoki et al.

(10) Patent No.: US 6,897,610 B1
(45) Date of Patent: May 24, 2005

(54) PLASMA DISPLAY PANEL

(75) Inventors: Masaki Aoki, Minoo (JP); Katsuyoshi Yamashita, Katano (JP); Mitsuhiro Ohtani, Sakai (JP); Junichi Hibino, Neyagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/720,609
(22) PCT Filed: Apr. 26, 2000
(86) PCT No.: PCT/JP00/02715
§ 371 (c)(1), (2), (4) Date: Dec. 26, 2000
(87) PCT Pub. No.: WO00/67283
PCT Pub. Date: Nov. 9, 2000

(30) Foreign Application Priority Data
Apr. 28, 1999 (JP) .......................... 11-122107
Oct. 26, 1999 (JP) .......................... 11-304431

(51) Int. Cl.⁷ .............................................. H01J 17/49
(52) U.S. Cl. ..................................................... 313/586
(58) Field of Search ............................... 313/586, 496, 313/495; 427/255

(56) References Cited
U.S. PATENT DOCUMENTS
4,578,619 A * 3/1986 Braude ........................ 313/586
5,703,437 A * 12/1997 Komaki ....................... 313/587
6,160,345 A * 12/2000 Tanaka et al. ............... 313/489
6,184,163 B1 * 2/2001 Lee et al. ...................... 501/32
6,439,943 B1 * 8/2002 Aoki et al. .................... 445/24

FOREIGN PATENT DOCUMENTS

| JP | 8077930 | 3/1996 |
| JP | 9050769 | 2/1997 |
| JP | 9278482 | 10/1997 |
| JP | 09-278482 | * 10/1997 |
| JP | 10283941 | 10/1998 |
| JP | 11054051 | 2/1999 |

* cited by examiner

Primary Examiner—David V. Bruce
Assistant Examiner—Jurie Yun

(57) ABSTRACT

The present invention provides a plasma display panel in which a space between a first plate and a second plate facing each other is filled with a discharge gas, a plurality of pairs of display electrodes made of Ag or Cu are formed on a surface of the first plate facing the second plate, and the surface of the first plate is covered with a dielectric layer covering the plurality of pairs of display electrodes, where the dielectric layer is made of a glass that contains at least ZnO and 10 wt % or less of $R_2O$ and does not substantially contain PbO and $Bi_2O_3$, and a product of permittivity $\epsilon$ and loss factor tan $\delta$ of the dielectric layer is 0.12 or less, wherein R is selected from a group consisting of K, Rb, Cs, Cu, and Ag.

15 Claims, 3 Drawing Sheets

PLASMA DISPLAY PANEL

TECHNICAL FIELD

The present invention relates to a plasma display panel used for a display device or the like. More particularly, the present invention relates to a dielectric layer.

BACKGROUND ART

Recently, high performance displays such as high-definition (e.g., Hi-Vision) or large-scale displays are much sought after, and various studies are performed for developing high-performance displays such as CRT displays, liquid crystal displays (LCD), and plasma display panel (PDP).

PDP is a kind of gas-discharge panel. To manufacture a PDP, two thin glass plates are disposed to face each other with partition walls (ribs) in between, and a plurality of pairs of display electrodes, a dielectric layer (typically, made of Ag or Cr/Cu/Cr in order to secure good conductivity), and a phosphor layer are formed in this order on the surface of one of the two thin glass plates facing the ribs, then the space between the two thin glass plates is filled with a discharge gas, and the space is sealed hermetically. Discharges are caused in the discharge gas to allow the phosphor to emit light. PDP has excellent characteristics. That is to say, unlike CRT, a large-screen PDP is not remarkably deep and heavy. Also, PDP does not have the problem of limited viewing angle which is observed in LCD.

Typically, the dielectric layer is made of a low-melting glass. In this case, characteristics such as enough dielectric strength, high transparency, and low baking temperature (more specifically, 600° C. or lower) are required. Glasses actually used for dielectric glass layers are lead oxide (PbO), glass (permittivity $\in$=10–15) including bismuth oxide ($Bi_2O_3$), etc. (See Japanese Laid-Open Patent Application No.9-50769, for example).

Meanwhile, as it is, desired in these days that the power consumption of electrical appliances is as small as possible, it is expected that the driving power consumption will be further reduced. Especially, considering that the power consumption of PDP is increasing due to the demand for larger-screen and higher-definition displays, it is required that the power consumption is reduced more aggressively.

One method of reducing the power consumption is to reduce the permittivity $\in$ in the dielectric layer. The permittivity $\in$ in the dielectric layer is proportionate to the amount of electric charge accumulated in the dielectric layer. It is therefore possible to further reduce the amount of electric charge accumulated in the dielectric layer by using a dielectric layer having composition with a permittivity $\in$ value lower than the PbO-base or $Bi_2O_3$-base dielectric layer. Japanese Laid-Open Patent Application No.8-77930 discloses specific glass composition with a permittivity $\in$ value lower than the PbO-base or $Bi_2O_3$-base dielectric layer: $Na_2O$—$B_2O_3$—$SiO_2$-base glass and $Na_2O$—$B_2O_3$—ZnO-base glass both with a permittivity $\in$ value of 7.2–7.6. It is possible to reduce amount of discharge current in each pixel cell per a certain voltage applied to the plurality of pairs of display electrodes (to about half or less of conventional ones) by using glasses with the above composition. This reduces the power consumption of the PDP. Also, according to the document, the dielectric layer can be formed without using a PbO-base glass. This provides an effect of avoiding environmental pollution with Pb.

It should be noted that in actual manufacturing of a PDP using the $Na_2O$—BO—SiO-base glass or NaO—BO—ZnO-base glass, $Na_2O$ is added to constitute more than 10 wt % of the whole dielectric layer to reduce the softening point (more specifically, to set the baking temperature to a range of 550° C. to 600° C.).

However, when the dielectric layer is made of the $Na_2O$—$B_2O_3$—$SiO_2$-base glass or $Na_2O$—$B_2O_3$—ZnO-base glass, Ag and Cu contained in the display electrodes move into the dielectric layer and are deposited as colloidal particles (see Latest Plasma Display Manufacturing Technique, 1987 edition, page 234). The colloidal particles reflect visible light of a certain wavelength. This turns the color of the dielectric layer to yellow (what is called yellowing). This puts an undesired color to the light emitted from the discharge space, or reduces the amount of light to be obtained. As apparent from the above, the colloidal particles can be a cause of ill effects on display performance. When $Na_2O$ is added to constitute more than 10 wt % of the whole dielectric layer, this could also be a cause of the yellowing. For these reasons, the deposition of the colloidal particles should be avoided.

The addition of $Na_2O$ to constitute more than 10 wt % of the whole dielectric layer provides another ill effect of increasing tan $\delta$ which indicates power loss in the dielectric layer. More specifically, it decreases the dielectric strength of the dielectric layer (having thickness of 20–50 $\mu$m)to approximately 1 kV.

As described above, plasma display panels have the following three main problems currently:
1. To improve luminous efficiency by reducing the permittivity $\in$ of the dielectric layer to reduce power consumption;
2. To set the softening point of the dielectric layer to a low value to ease the manufacturing process; and
3. To obtain superior display performance by preventing the yellowing of the dielectric layer to securing its transparency.

The present invention is provided to solve the above three problems and an object of the present invention to provide a PDP characterized in that the dielectric layer can be formed relatively easily, that the increase in the power consumption is restricted even if the PDP has a larger screen or higher definition, and that the PDP is driven with better luminous efficiency and display performance than conventional ones.

DISCLOSURE OF INVENTION

The inventors of the present invention studied hard to solve the above problems and provide a plasma display panel in which a space between a first plate and a second plate facing each other is filled with a discharge gas, a plurality of pairs of display electrodes made of Ag or Cu are formed on a surface of the first plate facing the second plate, and the surface of the first plate is covered with a dielectric layer covering the plurality of pairs of display electrodes, characterized in that: the dielectric layer is made of a glass that contains at least ZnO and 10 wt % or less of $R_2O$ and does not substantially contain PbO and $Bi_2O_3$, and a product of permittivity $\in$ and loss factor tan $\delta$ of the dielectric layer is 0.12 or less, wherein R is selected from a group consisting of Li, Na, K, Rb, Cs, Cu, and Ag.

The inventors of the present invention have found that with the above construction, the amount of $R_2O$ in the dielectric layer is reduced, the deposition of the colloidal particles is suppressed, excellent transparency of the dielectric layer is secured, and the power consumption is reduced compared with conventional ones. The inventors have also found that the dielectrics layer can be baked at 600° C. or lower. As understood from this, the present invention can reduce the manufacturing cost (e.g., the cost for baking the dielectrics layer) and drive the plasma display panel with excellent display performance and luminous efficiency and with less power than conventional ones. Also, since the above glass composition does not contain Pb, environmental pollution with Pb can be avoided.

It should be noted here that the numerical definition "0.12 or less" for the product of permittivity ∈ and loss factor tan δ of the dielectric layer is required to reduce power consumption, and this specific value range was determined from the data of Examples which will be described later.

In the above plasma display panel, it is desirable that the permittivity ∈ of the dielectric layer is 7 or less since it will effectively reduce the value ∈·tan δ.

With regard to specific glass composition of the dielectric layer, it has been found from data of Examples which will be described later that the following glass compositions are desirable.

The dielectric layer may contain 10–25 wt % of $P_2O_5$, 20–35 wt % of $ZnO_3$, 30–40 wt % of $B_2O$, 5–12 wt % of SiO, 10 wt % or less of $R_2O$, and 10 wt % or less of DO, and the permittivity ∈ of the dielectric layer is 7 or less, wherein D is selected from a group consisting of Mg, Ca, Ba, Sr, Co, Cr, and Ni.

The dielectric layer may be composed of a ZnO—$P_2O_5$-base glass which contains 42–50 wt % of $P_2O_5$, 35–50 wt % of ZnO, 7–14 wt % of $Al_2O_3$, and 5 wt % or less of NaO, and the permittivity ∈ of the dielectric layer is 7 or less.

The dielectric layer may be composed of a ZnO-base glass which contains 20–44 wt % of ZnO, 38–55 wt % of $B_2O_3$, 5–12 wt % of $SiO_2$, 10 wt % or less of $R_2O$, and 10 wt % or less of MO, and the permittivity ∈ of the dielectric layer is 7 or less, wherein R is selected from a group consisting of Li, Na, K, Rb, Cs, Cu, and Ag, and M is selected from a group consisting of Mg, Ca, Ba, Sr, Co, and Cr.

The dielectric layer may be composed of a ZnO-base glass which contains 20–43 wt % of ZnO, 38–55 wt % of $B_2O_3$, 5–12 wt % of $SiO_2$, 1–10 wt % of $Al_2O_3$, 10 wt % or less of $R_2O$, and 10 wt % or less of MO, and the permittivity ∈ of the dielectric layer is 7 or less, wherein R is selected from a group consisting of Li, Na, K, Rb, Cs, Cu, and Ag, and M is selected from a group consisting of Mg, Ca, Ba, Sr, Co, and Cr.

The dielectric layer may be composed of a ZnO-base glass which contains 1–15 wt % of ZnO, 20–40 wt % of $B_2O_3$, 10–30 wt % of $SiO_2$, 5–25 wt % of $Al_2O_3$, 3–10 wt % of $Li_2O$, and 2–15 wt % of MO, and the permittivity ∈ of the dielectric layer is 7 or less, wherein M is selected from a group consisting of Mg, Ca, Ba, Sr, Co, and Cr.

The dielectric layer may be composed of a ZnO-base glass which contains 35–60 wt % of ZnO, 25–45 wt % of $B_2O_3$, 1–10.5 wt % of $SiO_2$, 1–10 wt % of $Al_2O_3$, and 5 wt % or less of $Na_2O$, and the permittivity ∈ of the dielectric layer is 7 or less.

The dielectric layer may be composed of a ZnO-base glass which contains 35–60 wt % of ZnO, 25–45 wt % of $B_2O_3$, 1–12 wt % of $SiO_2$, 1–10 wt % of $Al_2O_3$, and 5 wt % or less of $K_2O$, and the permittivity ∈ of the dielectric layer is 7 or less.

The dielectric layer may be composed of a ZnO—$Nb_2O_5$-base glass which contains 9–19 wt % of $Nb_2O_5$, 35–60 wt % of ZnO, 20–38 wt % of $B_2O_3$, 1–10.5 wt % of $SiO_2$, and 5 wt % or less of $Li_2O$, and the permittivity ∈ of the dielectric layer is 7 or less.

With regard to specific glass composition of the dielectric layer, it has been found from data of Examples which will be described later that the following glass compositions dispense with $R_2O$.

The dielectric layer may be made of a glass which is composed of 20–30 wt % of $P_2O_5$, 30–40 wt % of ZnO, 30–45 wt % of $B_2O_3$, and 1–10 wt % of $SiO_2$ and a product of permittivity ∈ and loss factor tan δ of the dielectric layer is 0.12 or less.

The dielectric layer may be made of a glass which is composed of 30–45 wt % of ZnO, 40–60 wt % of $B_2O_3$, and 1–15 wt % of $SiO_2$ and a product of permittivity ∈ and loss factor tan δ of the dielectric layer is 0.12 or less.

The dielectric layer may be made of a glass which is composed of 30–45 wt % of ZnO, 40–55 wt % of $B_2O_3$, 1–10 wt % of $SiO_2$, 1–10 wt % of $Al_2O_3$, and 1–5 wt % of CaO, and a product of permittivity ∈ and loss factor tan δ of the dielectric layer is 0.12 or less.

The dielectric layer may be made of a glass which is composed of 40–60 wt % of ZnO, 35–45 wt % of $B_2O_3$, 1–10 wt % of $SiO_2$, and 1–10 wt % of $Al_2O_3$, and a product of permittivity ∈ and loss factor tan δ of the dielectric layer is 0.12 or less.

The dielectric layer may be made of a glass which is composed of 30–60 wt % of ZnO, 30–50 wt % of $B_2O_3$, 1–10 wt % of $SiO_2$, and 1–10 wt % of $Al_2O_3$, and a product of permittivity ∈ and loss factor tan δ of the dielectric layer is 0.12 or less.

The dielectric layer may be made of a glass which is composed of 9–20 wt % of $Nb_2O_5$, 35–60 wt % of ZnO, 25–40 wt % of $B_2O_3$, and 1–10 wt % of SiO2, and a product of permittivity ∈ and loss factor tan δ of the dielectric layer is 0.12 or less.

The above object is also fulfilled by a plasma display panel in which a space between a first plate and a second plate facing each other is filled with a discharge gas, a plurality of pairs of display electrodes made of Ag or Cu are formed on a surface of the first plate facing the second plate, and the surface of the first plate is covered with a dielectric layer covering the plurality of pairs of display electrodes, characterized in that: the dielectric layer is composed of a first dielectric layer which either is a thin film of $SiO_2$, $Al_2O_3$, or ZnO or is made of a glass containing at least PbO or $Bi_2O_3$, and covers the plurality of pairs of display electrodes, and a second dielectric layer made of a glass in which a product of permittivity ∈ and loss factor tan δ is 0.12 or less, the second dielectric layer covering the first dielectric layer.

With the above construction, the first dielectric layer effectively suppresses colloidal particles from being deposed out of the plurality of pairs of display electrodes, secures excellent transparency of the dielectric layer, and enhances the display performance of the plasma display panel. The second dielectric layer effectively reduces the power consumption of plasma display panel by reducing the permittivity ∈ value.

A total thickness of the dielectric layer may be 40 μm or less, and a thickness of the first dielectric layer may be half of the total thickness or less. With this construction, it is possible to reduce the total amount of Pb used for the dielectrics layer, providing an effect of avoiding environmental pollution with Pb. It should be noted here that the value "40 μm" indicates the maximum thickness of general dielectric layers.

BEST MODE FOR CARRYING OUT THE INVENTION

1. Embodiment 1

1-1. Entire Construction of PDP

Figure 1:
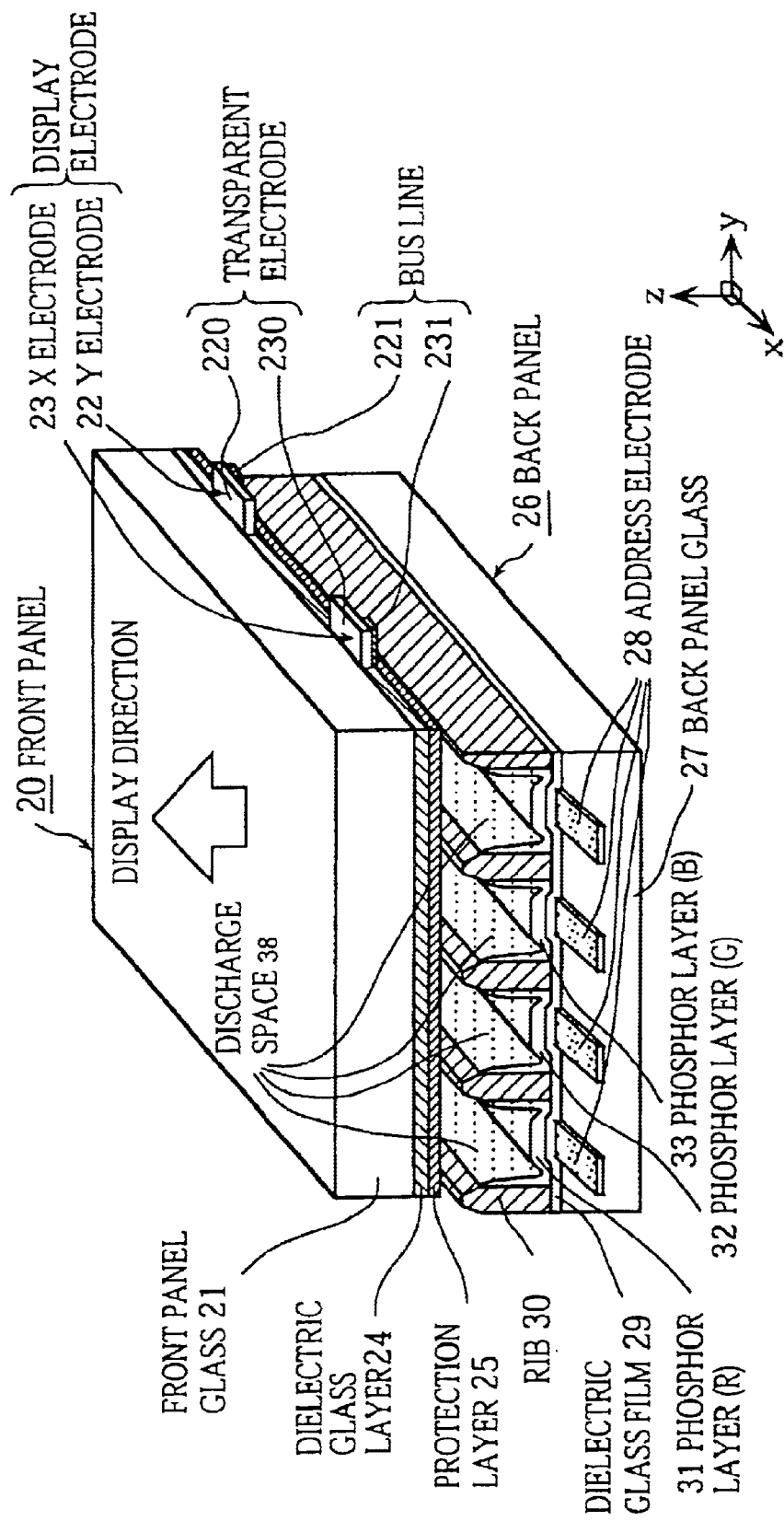
FIG. 1 is a perspective, sectional view showing main components of the AC surface-discharge type PDP in Embodiment 1.

FIG. 1 is a perspective, sectional view showing main components of the AC surface-discharge type plasma display panel (hereinafter called PDP) in Embodiment 1. In the drawing, the z direction is a direction along thickness of the PDP and the xy plane is parallel to the panel surface of the PDP. Though the size of the PDP in the present embodiment conforms to the VGA specifications for 42-inch class, the present invention can be applied to other sizes as well.

As shown in FIG. 1, the PDP is roughly divided into the front panel 20 and the back panel 26 which are disposed so that their main surfaces face each other.

On one surface of the front panel glass 21, which is the substrate of the front panel 20, a plurality of pairs of display electrodes 22 and 23 (an X electrode 23 and a Y electrode 22) are disposed in the x direction, where the y direction is the direction of the length, and each pair of display electrodes 22 and 23 are composed of 0.1 $\mu$m-thick, 370 $\mu$m-wide belt-shaped transparent electrodes 220 and 230 and 5 $\mu$m-thick, 100 $\mu$m-wide bus lines 221 and 231. A surface discharge is performed in a space (approximately 80 $\mu$m) between each pair of display electrodes 22 and 23. The bus lines 221 and 231 are made of Ag or Cr/Cu/Cr having superior conductivity.

It should be noted that the above plurality of pairs of display electrodes 22 and 23 may be composed of only bus lines. In this case, it is desirable that the space between each pair of display electrodes 22 and 23 is approximately 80 $\mu$m.

The main surface of the front panel glass 21 with the display electrodes 22 and 23 having been disposed on it is coated with an approximately 30 $\mu$m-thick dielectric layer 24 (its detailed composition will be described later) first, and with an approximately 1.0 $\mu$m-thick protection layer 25 made of magnesium oxide (MgO).

On one surface of the back panel glass 27, which is the substrate of the back panel 26, a plurality of 5 $\mu$m-thick, 100 $\mu$m-wide address electrodes 28 are disposed in stripes at regular intervals (at intervals of approximately 150 $\mu$m) in the y direction, where the x direction is the direction of the length. The main surface of the back panel glass 27 with the address electrodes 28 having been disposed on it is coated with a 30 $\mu$m-thick dielectric film 29.

On the surface of the dielectric film 29, approximately 150 $\mu$m-high, approximately 40 $\mu$m-wide ribs 30 are disposed to match spaces between the plurality of address electrodes 28. In each channel composed of two sides of two adjacent ribs 30 and the surface of the dielectric layer 29, one of phosphor layers 31 to 33 corresponding to red (R), green (G), and blue (B) is formed. The phosphor layers 31 to 33 of red, green, and blue are repeatedly disposed in sequence in the x direction.

The front panel 20 and the back panel 26 with the above construction are disposed so that the length of the address electrodes 28 is perpendicular to the length of the display electrodes 22 and 23. The outer regions of the panels 20 and 26 are bonded to be sealed. A discharge gas (seal-in gas) composed of a rare gas such as He, Xe, or Ne is sealed in the space between the panels 20 and 26 with a certain pressure (in the typical, conventional cases, with a pressure of approximately 500–760 Torr).

Each space between two adjacent ribs 30 is a discharge space 38. Each area at the intersection of a pair of adjacent display electrodes 22 and an address electrode 28 with a discharge space 38 in between corresponds to a cell (not illustrated) used for displaying images. The cell pitch in the x direction is approximately 1080 $\mu$m and the cell pitch in the y direction is approximately 360 $\mu$m.

When the PDP is driven, a panel driving unit (not-illustrated) applies a pulse to the address electrode 28 and one of the display electrodes 22 and 23 to generate a writing discharge (address discharge) in each cell. Note that in Embodiment 1, the panel driving unit applies a pulse to the X electrode 23. Generally, the X electrode 23 is called a scan electrode, and the Y electrode 22 a sustain electrode. The panel driving unit then applies a pulse to between a pair of display electrodes 22 and 23 to generate a discharge, which generates ultraviolet rays of short wavelength (resonance lines with central wavelength of 147 nm). This allows the phosphor layers 31–33 to emit light and display an image.

The main characteristic of the present PDP is in the composition of the dielectric layer 24. That is to say, the dielectric layer 24 is composed of a ZnO—$P_2O_5$-base glass (hereinafter called ZnO—$P_2O_5$-base glass of the present invention) that does not include PbO or $Bi_2O_3$. The ZnO—$P_2O_5$-base glass of the present invention is composed of, for example, 10 wt % of $P_2O_5$, 20 wt % of ZnO, 40 wt % of $B_2O_3$, 12 wt % of $SiO_2$, 3 wt % of BaO, and 10 wt % of $Na_2O$. The ZnO—$P_2O_5$-base glass of the present invention has a lower permittivity ∈ value than PbO-base glasses or $Bi_2O_3$-base glasses that have conventionally been used for the dielectric layer (more specifically, while the permittivity ∈ value of PbO-base or ZnO-base glasses is approximately 10 to 12, that of the present invention is approximately 7 or lower). Also, the conventional product of the permittivity ∈ value and the loss factor, ∈·tan δ is 0.14–0.7. The ∈·tan δ value of the dielectric layer 24 in Embodiment 1 is approximately 0.103 or lower, which is much lower than the conventional one.

1-2. Effects of Construction of Dielectric Layer in Embodiment 1

Figure 3:
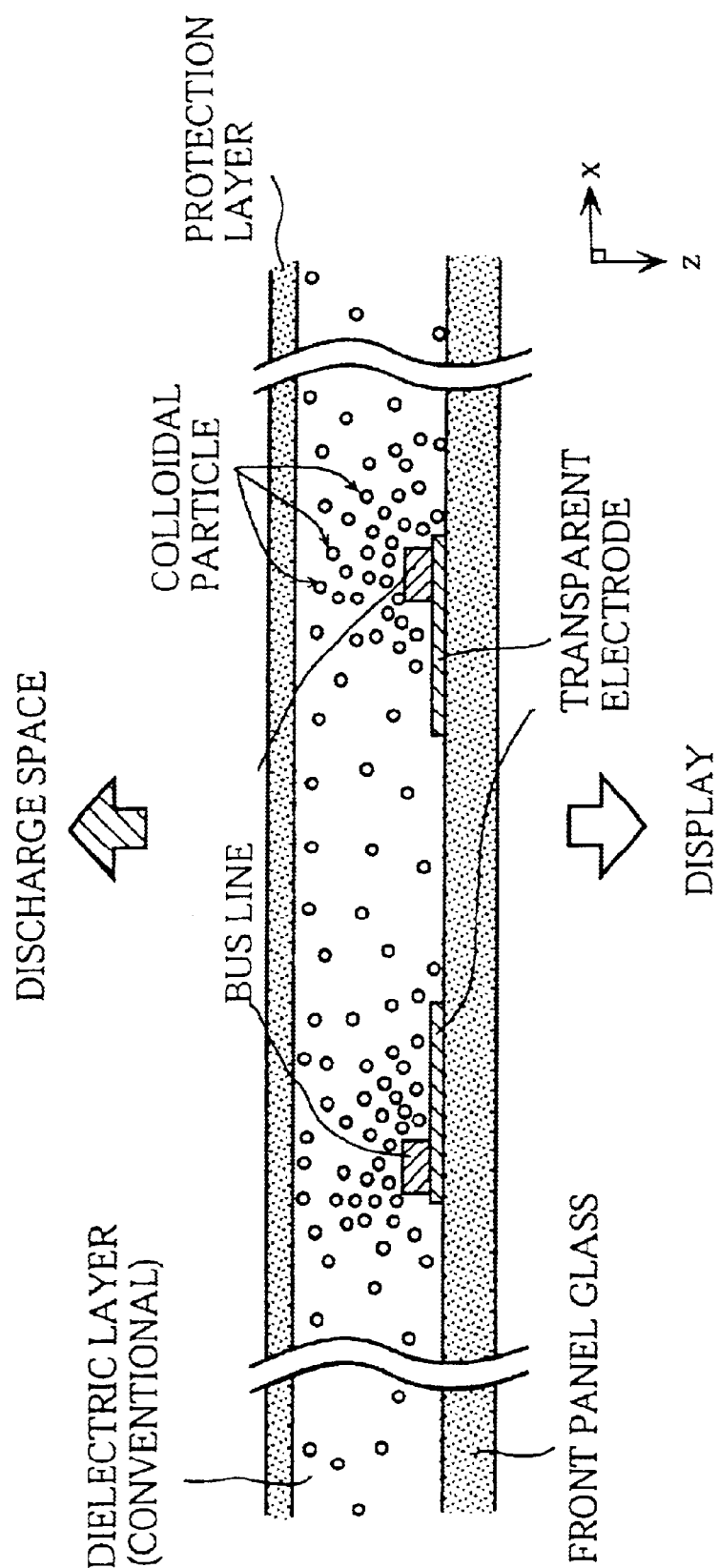
FIG. 3 is a partial sectional view of the PDP showing a detailed construction of a conventional dielectric layer and the surroundings.

FIG. 3 is a partial sectional view of the PDP showing a detailed construction of a conventional dielectric layer and the surroundings. As shown in FIG. 3, in the conventional dielectric layer, Ag and Cu ions contained in the bus lines move into the dielectric layer as colloidal particles, and the colloidal particles reflect visible light, and turn the color of the dielectric layer to yellow (what is called yellowing) (see Latest Plasma Display Manufacturing Technique, 1987 edition, page 234). The yellowing caused by the colloidal particles is remarkable as the amount of $R_2O$ is one of Li, Na, K, Rb, Cs, Cu, and Ag) contained in the glass is much (e.g., more than 10 wt %). In contrast, in the dielectric layer 24 made of the ZnO—$P_2O$-base glass of the present invention, the amount of RO (in the present embodiment, $R_2O$=$Na_2O$) is as small as 10 wt % or less, which suppresses the generation of colloidal particles. As a result, if Ag or Cu are used as the material of the bus lines, the transparency of the dielectric layer 24 is higher than the conventional one. This prevents the above problems of discoloration and light amount loss which occur in the discharge space 38, and provides superior display performance of the PDP.

When a pulse is applied to between a pair of display electrodes 22 and 23 at an early stage of the discharge sustain period for driving the present PDP having the above dielectric layer 24, a discharge is generated there.

In Embodiment 1, the dielectric layer 24 has a lower permittivity $\in$ value (e.g., $\in$=6.4) than conventional one ($\in$=10–15). As a result, the amount of electric charge accumulated in the dielectric layer 24 before the discharge starts is reduced. This allows the discharge to start with a small amount of current. The present PDP therefore starts discharging with a less power than conventional one, and is driven with less power consumption.

As described above, the PDP of Embodiment 1 has reduced power consumption and superior display performance, and greatly improves the luminous efficiency.

1-3. Relationships Between Permittivity $\in$ of Dielectric Layer and Power Consumption in PDP Generally, the following formula holds true:

$$C = \in S/d, \quad \text{(Formula 1)}$$

where S represents the area of a pair of display electrodes 22 and 23, C the capacitance (the capacitance of a portion of the dielectric layer above the discharge space 38) between the pair of display electrodes 22 and 23, d the thickness of the dielectric layer 24, and $\in$ the permittivity $\in$ value of the dielectric layer 24.

Also, the following formula holds true:

$$W = fCV^2 = f(\in S/d)V^2, \quad \text{(Formula 2)}$$

where V represents the voltage applied to between the pair of display electrodes 22 and 23, f the driving frequency of the panel, and W the power consumption of the PDP.

As apparent from the Formulas 1 and 2, when f and $V^2$ are constant, the smaller the capacitance C is, the smaller the power consumption W is. Since the capacitance C is proportionate to the permittivity $\in$, the lower the permittivity $\in$ is, the smaller the power consumption W is (for detailed information, see Transactions of Electrical Engineers of Japan A, Vol. 118, No. 15, 1998, pages 537–542).

Also, when the expression E (electric field strength)=V/d is applied, the following formula holds true (see Electronics Material, Denki Shoin, Mar. 10, 1975, page 23):

$$W \propto f(\in \cdot \tan \delta)V^2, \quad \text{(Formula 3)}$$

where w represent the power loss of the PDP.

Since generally, the power loss w is proportionate to the power consumption W, it is apparent from the Formula 3 that the lower at least either permittivity $\in$ or tan $\delta$ value is, the smaller the power consumption W (for detailed information, see Transactions of Electrical Engineers of Japan A, Vol. 118, No. 15, 1998, pages 537–542).

The effect of the PDP in Embodiment 1 can be explained based on the above theory. That is to say, when the dielectric layer 24 is made of the ZnO—$P_2O_5$-base glass of the present invention (that does not contain PbO or $Bi_2O_3$ but contains $P_2O_5$, ZnO, $B_2O_3$, $SiO_2$, BaO, $Na_2O$ or the like), the product of the permittivity $\in$ value and the loss factor, $\in \cdot \tan \delta$ is reduced (more specifically, reduced to 0.12 or lower), the power loss w is reduced, and the power consumption W of the PDP is reduced.

The dielectric layer 24 in Embodiment 1 may be made of a ZnO-base glass that does not contain PbO or $Bi_2O_3$ (hereinafter called a ZnO-base glass of the present invention), which will be described later in another embodiment. The ZnO-base glass of the present invention is composed of, for example, 40 wt % of ZnO, 45 wt % of $B_2O_3$, 5 wt % of $SiO_2$, 5 wt % of $Al_2O_3$, and 5 wt % of $Cs_2O$. Also, the dielectric layer 24 in Embodiment 1 may be made of a $Nb_2O_5$—ZnO-base glass that does not contain PbO or $Bi_2O_3$ (hereinafter called a $Nb_2O_5$—ZnO-base glass of the present invention). The $Nb_2O_5$—ZnO-base glass of the present invention is composed of, for example, 19 wt % of $Nb_2O_5$, 44 wt % of ZnO, 30 wt % of $B_2O_3$, and 7 wt % of $SiO_2$.

Variations of the composition of the glass used for the dielectric layer 24 will be described in detail in the following embodiments.

2. Embodiment 2

The PDP in Embodiment 2 will be described. The construction of Embodiment 2 is almost the same as Embodiment 1 except for the dielectric layer.

2.1 Construction of Dielectric Layer and Surroundings

Figure 2:
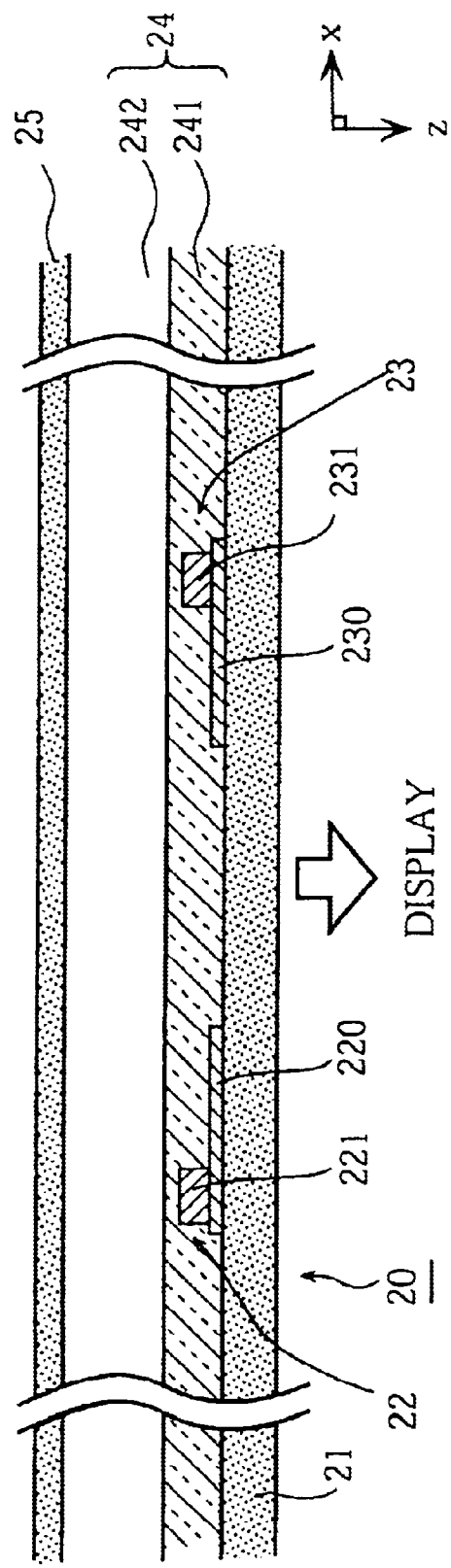
FIG. 2 is a partial sectional view of the PDP showing a detailed construction of the dielectric layer in Embodiment 2 and the surroundings.

FIG. 2 is a partial sectional view of the PDP showing a detailed construction of the dielectric layer 24 in Embodiment 2 and the surroundings. As shown in FIG. 2, the dielectric layer 24 in Embodiment 2 has a two-layered construction in which the second dielectric layer 242 is laid on the first dielectric layer 241.

The first dielectric layer 241 is composed of a 5μm-thick PbO-base glass (which is composed of, in this example, 65 wt % of PbO, 10 wt % of $B_2O_3$, 24 wt % of $SiO_3$, 1 wt % of CaO, and 2 wt % of $Al_2O_3$), and is formed on the main surface of the front panel glass 21 covering the display electrodes 22 and 23.

The second dielectric layer 242 is composed of a 25 μm-thick ZnO—$P_2O_5$-base glass (which is composed of, in this example, 30 wt % of ZnO, 20 wt % of $P_2O_5$, 40 wt % of $B_2O_3$, and 10 wt % of $SiO_2$). The permittivity $\in$ value of the second dielectric layer 242 is approximately 6.3.

2-2. Effects of Dielectric Layer in Embodiment 2

Though the PbO-base glass used for the first dielectric layer 241 has a permittivity $\in$ value (e.g., $\in$=11) that is at the same level as the conventional one ($\in$=10–15), the PbO-base glass is characterized by suppressing Ag and Cu ions from moving in from the bus lines 221 and 231 as colloidal particles.

In Embodiment 2, the first dielectric layer 241 and the second dielectric layer 242 having the above characteristics are disposed as a stack so that the first dielectric layer 241 made of the PbO-base glass and covering the display electrodes 22 and 23 suppresses the generation of colloidal particles, and the second dielectric layer 242 having a relatively low permittivity $\in$ value reduces the power consumption of the PDP. As another measure for reducing the power consumption of the PDP, the first dielectric layer 241 is formed to be as thin as 5 μm to reduce the total permittivity $\in$ value of the dielectric layer 24 so that the amount of electric charge accumulated in the dielectric layer 24 is reduced. Also, by making the first dielectric layer 241 thin as described above, the amount of used Pb is reduced, which is useful in avoiding environmental pollution with Pb.

Generally, the maximum thickness of the dielectric layer is 40 μm. Accordingly, to obtain the effects (e.g., reducing the amount of Pb) of the dielectric layer 24 of the present invention sufficiently, the thickness should be set to 40 μm or less. Also, by setting the thickness of the first dielectric layer 241 to half of the total thickness of the dielectric layer 24 or less, the amount of Pb is further effectively reduced.

In the present PDP having the above dielectric layer 24, when a pulse is applied to between each pair of display electrodes 22 and 23 at an early stage of the discharge sustain period for driving the PDP, a discharge is generated in gap between the display electrodes 22 and 23 in the first dielectric layer 241. Plasma of the discharge gas expands to the discharge space 38 via the second dielectric layer 242.

The discharge changes to a sustain discharge and the emission luminance gradually increases.

The PDP in Embodiment 2 is driven with a small power consumption since the permittivity ∈ value of the second dielectric layer 242 is lower than conventional one and as is the case with Embodiment 1, the amount of electric charge accumulated in the dielectric layer and necessary for discharge is reduced.

Also, as is the case with Embodiment 1, the generation of colloidal particles of Ag and Cu contained in the bus lines 221 and 231 is suppressed since the first dielectric layer 241 made of PbO-base glass covers the bus lines 221 and 231. This suppresses the yellowing of the dielectric layer 24 and increases the transparency. As a result, the phosphor light emitted from the discharge space 38 is not discolored and used for the emission display of the PDP in good condition.

The first dielectric layer 241 may be made of a $Bi_2O_3$-base glass instead of the PbO-base glass, or may be formed as a thin-film oxide layer of $SiO_2$, $Al_2O_3$, or ZnO. These thin-film oxide layers can be formed with the sputtering method.

The second dielectric layer 242 may be made of a ZnO-base glass instead of the ZnO—$P_2O_5$-base glass. The specific composition of these glasses will be described in detail in the sections for Examples.

Japanese Laid-Open Patent Application No. 9–50769 discloses a two-layered dielectric layer. In this technique, however, the first dielectric layer is made of a ZnO-base glass and the second dielectric layer is made of a PbO-base glass (i.e., the two layers are in reverse order, compared with the dielectric layer of Embodiment 2). The construction disclosed in this document is clearly different from the present invention. In the construction disclosed in this document, Ag and Cu ions tend to move from the bus lines into the first dielectric layer as colloidal particles and cause the yellowing. Furthermore, it is expected that the permittivity ∈ value of the dielectric layer of this technique is much higher than the present invention since the ZnO-base glass disclosed in this document contains $Bi_2O_3$. Judging from these, it is difficult for the technique disclosed in Japanese Laid-Open Patent Application No. 9–50769 to obtain the effects of the present invention: small power consumption and suppression of the yellowing of the dielectric layer.

3. PDP Manufacturing Method

The following is a description of an example method of manufacturing the PDPs of the above embodiments.

3-1. Manufacturing Front Panel

An approximately 2.6 mm thick front panel glass 21 made of a soda lime glass is formed with the float method in which the glass material (soda lime glass) is floated on the surface of melted Sn (tin) at approximately 360° C. Display electrodes 22 and 23 are then formed on the surface of the front panel glass 21. To manufacture the display electrodes 22 and 23, first the transparent electrodes 220 and 230 are formed with the following photoetching method.

An approximately 0.5 μm-thick photoresist (e.g., ultraviolet-hardening resin) is applied to the whole surface of the front panel glass 21. A photomask patterning the transparent electrodes 220 and 230 is laid on the applied photoresist, ultraviolet rays are applied to this, and this is soaked in a developing solution to remove unhardened resin. The material (e.g., ITO) for the transparent electrodes 220 and 230 is applied to gaps between the resists on the front panel glass 21. The resists are then removed by a cleaning solution or the like. This completes the transparent electrodes 220 and 230.

Bus lines 221 and 231 each having thickness of approximately 7 μm and width of approximately 50 μm are then formed on the transparent electrodes 220 and 230 using an Ag-base or Cr/Cu/Cr-base metal. In the case of an Ag-base metal, the screen printing method can be used. In the case of a Cr/Cu/Cr-base metal, the vapor deposition or sputtering method can be used.

With the above process, the display electrodes 22 and 23 are formed.

3-1-1. Manufacturing Dielectric Layer in Embodiment 1 (Single-Layered Dielectric Layer)

Here, a method of manufacturing the dielectric layer (using a $P_2O_5$—ZnO-base glass) in Embodiment 1 will be described.

First, a glass paste is prepared by mixing $P_2O_5$—ZnO-base glass powder (composed of, for example, 10–25 wt % of $P_2O_5$, 20–35 wt % of ZnO, 30–55 wt % of $B_2O_3$, 5–12 wt % of $SiO_2$, 10 wt % or less of BaO, and 10 wt % or less of $Na_2O$) with an organic binder solution (a solution mixed with 45 wt % of an organic solvent which contains 0.2 wt % of Homogenol as dispersant, 2.5 wt % of dibutyl phthalate as plasticizer, and 10 wt % of ethyl cellulose) at a ratio of 55:45 by weight. The glass paste is applied, with the printing method, to the whole surface of the front panel glass 21 on which the display electrodes 22 and 23 have been formed, to form a coat. The coat is baked at temperature of 600° C. or lower (more specifically, for 10 minutes at 520° C.) to form the dielectric layer 24 having thickness of 30 μm. As described above, the inventors of the present invention have found that with the specific composition of the ZnO—$P_2O_5$-base glass of the present invention, it is possible to bake the coat at a 600° C. or lower, a temperature relatively low for baking glass, which facilitates the manufacturing process. The material for the dispersant can be selected from the group including Homogenol, sorbitan sesqui-oleate, and polyoxyethylene mono-oleate.

Conventional processes for forming the dielectric layer have a problem that Ag and Cu contained in the bus lines move into the dielectric layer and are deposited as colloidal particles having diameter of 300–400 Å (see FIG. 3). The reason for this is thought to be as follows: when the front panel glass is formed with the float method, Tin ions ($Sn^{2+}$) are attached to a surface of the front panel glass, remain there and reduce $Ag^+$ and $Cu^+$ that have dissolved in the dielectric layer from each bus line (e.g., $2Ag^+ + Sn^{2+} \rightarrow Ag + Sn^{4+}$). Furthermore, when the dielectric layer contains 10 wt % or more of $R_2O$ is one of Li, Na, K, Rb, Cs, Cu, and Ag), the reduction reaction is enhanced. This phenomenon has been revealed by the inventors of the present invention and others. The reason for this phenomenon is thought to be as follows: Diffusion of $Ag^+$ and $Cu^{2+}$ into the dielectric layer is promoted by the presence of $R_2O$ which has relatively small ion radius.

The present invention sets the ratio of $R_2O$ (in this example, $Na_2O$) to the total amount of the dielectric layer 24 to 10 wt % or less so that the reduction reaction is suppressed, the generation of the colloidal particles is prevented, and the dielectric layer 24 is made transparent.

3-1-2. Manufacturing Dielectric Layer in Embodiment 2 (Two-Layered Dielectric Layer)

Here, a method of manufacturing the dielectric layer (using a PbO-base glass for the first dielectric layer and a $P_2O_5$—ZnO-base glass for the second dielectric layer) in Embodiment 2 will be described.

First, a glass paste is prepared by mixing PbO-base glass powder (composed of, for example, 65 wt % of PbO, 10 wt % of $B_2O_3$, 24 wt % of $SiO_2$, 1 wt % of CaO, and 2 wt % of $Al_2O_3$) with an organic binder solution (a solution mixed with 45 wt % of an organic solvent which contains 0.2 wt % of Homogenol as dispersant, 2.5 wt % of dibutyl phthalate as plasticizer, and 10 wt % of ethyl cellulose) at a ratio of 55:45 by weight. The glass paste is applied, with the printing method, to the whole surface of the front panel glass 21 on which the display electrodes 22 and 23 have been formed, to form a coat. The coat is baked (more specifically, baked for 10 minutes at 500° C.) to form the first dielectric layer 241 having thickness of 5 μm.

Note that the first dielectric layer 241 may be formed by sputtering an oxide such as $SiO_2$, $Al_2O_3$, and ZnO to form a thin film.

Care should be taken so that the glass material for the first dielectric layer 241 has a higher melting point than the glass material for the second dielectric layer 242.

Secondly, a glass paste is prepared by mixing a $P_2O_5$—ZnO-base glass powder (composed of, for example, 30 wt % of ZnO, 20 wt % of $P_2O_5$, 40 wt % of $B_2O_3$, and 10 wt % of $SiO_2$) with an organic binder solution (a solution mixed with 45 wt % of an organic solvent which contains 0.2 wt % of Homogenol as dispersant, 2.5 wt % of dibutyl phthalate as plasticizer, and 10 wt % of ethyl cellulose) at a ratio of 55:45 by weight. The glass paste is applied, with the printing method, to the whole surface of the front panel glass 21 on which the first dielectric layer 241 has been formed, to form a coat. The coat is baked (more specifically, baked for 10 minutes at 530° C.) to form the second dielectric layer 242 having thickness of 25 μm.

With the above process, the two-layered dielectric layer 24 is formed.

The protection layer 25 approximately 0.9 μm thick made of magnesium oxide (MgO) is formed on the surface of the dielectric layer 24.

With the above process, the front panel 20 is manufactured.

3.2. Manufacturing Back Panel

A plurality of address electrodes 28 approximately 5 μm thick are formed by applying an Ag-base conductive material on the surface of the back panel glass 27 with the screen printing method in stripes of equal spacing, where the back panel glass 27 is approximately 2.6 μm thick, made of soda lime glass, and formed with the float method.

The dielectric film 29 is then formed by applying the same glass paste as the dielectric layer 24 to the whole surface of the back panel glass 27 on which the address electrodes 28 have been formed, to form a coat having thickness of approximately 20 μm, and baking the coat. One rib 30 approximately 150 μm high is then formed, using the same glass material as the dielectric film 29, on the dielectric film 29 above each space (approximately 150 μm wide) between each pair of adjacent address electrodes 28. The ribs 30 are formed, for example, by applying repetitively a glass paste containing the above glass material with the screen printing method, then baking the applied glass paste.

After the ribs 30 are formed, the phosphor layers 31 to 33 are formed by applying phosphor inks containing the red (R), green (G), and blue (B) phosphors to the sides of the ribs 30 and the surface of the dielectric film 29 exposed between each pair of adjacent ribs 30, and drying and baking the applied inks.

Here, an example of phosphor materials generally used for PDP will be listed.

red phosphor: $(Y_xGd_{1-x})BO_3$: $Eu^{3+}$
green phosphor: $Zn_2SiO_4$: $Mn^{3+}$
blue phosphor: $BaMgAl_{10}O_{17}$: $Eu^{2+}$
(or $BaMgAl_{14}O_{23}$: $Eu^{2+}$)

Each phosphor material may be, for example, powder having average grain size of approximately 3 μm. There are several methods for applying the phosphor ink. In this example, the phosphor ink is applied with a method in which the ink is spouted out from a moving nozzle. This method is effective in applying the phosphor ink evenly. It should be noted here that the method for applying the phosphor ink is not limited to the above method, and other methods such as the screen printing method may be used.

With the above process, the back panel 26 is formed.

In the above examples, the front panel glass 21 and the back panel glass 27 are made using soda lime glass. However, they may be made with other materials.

3-3. Completion of PDP

The front panel 20 and the back panel 26 having been formed as described above are bonded together using a sealing glass. Air in the discharge space 38 is then exhausted until the space becomes high vacuum ($8 \times 10^7$ Torr). The discharge space 38 is then filled with an Ne—Xe-base, He—Ne—Xe-base, or He—Ne—Xe—Ar-base discharge gas with a certain pressure (500–760 Torr).

With this process, the PDP is completed.

4. Manufacturing Examples and Measuring Performance 4-1. Manufacturing Examples and Comparative Examples To evaluate performance of the PDP of the present invention, PDP examples were manufactured in accordance with the above manufacturing method. 60 variations (No. 1–60) which only differ in the composition of the dielectric layer (ZnO-base glass, $P_2O_5$-base glass, or ZnO—$P_2O_5$-base glass) were manufactured. Among these examples No. 1–60, No. 1–54 correspond to the PDP of Embodiment 1 (PDP having a single-layered dielectric layer), and No. 55–60 correspond to the PDP of Embodiment 2 (PDP having a two-layered dielectric layer). Examples No. 4, 20, 29, 43, 47, and 51 do not contain $R_2O$.

Also, 15 PDPs having a dielectric layer of conventional glass composition ($Bi_2O_3$-base or PbO-base glass—for detailed composition, see Table 11 and 12) were manufactured as Comparative Examples (No. 61–75). Among these, 3 PDPs (No. 65–67) have a dielectric layer of ZnO-base glass, $P_2O_5$-base glass, or ZnO—$P_2O_5$-base glass, each containing more than 10 wt % of $R_2O$ ($Na_2O$).

The thickness of the dielectric layer in each of Examples and Comparative Examples No. 1–75 is unified to 30 μm. The dielectric layer in each Example and Comparative Example was formed with the printing method except for No. 58–60 in which the first dielectric layer was formed with the sputtering method.

For each of the manufactured PDPs No. 1–75, dielectric layer discoloring, loss factor (tan δ), withstand voltage (DC), ∈· tan δ, permittivity ∈, PDP panel brightness (cd/m²), PDP power consumption (W), etc. were measured. Detailed measuring methods will be shown below. Discoloring of the dielectric layer was observed by naked eye while the PDP was set to the white balance display state.

4-2. Measuring Dielectric Layer Loss Factor (tan δ) and Permittivity ∈

The withstand voltage and loss factor of the dielectric layer of each PDP were measured using an LCR meter (4284A made by Hewlett Packard Company) by applying an alternating voltage (10 kHz of frequency). The detailed measuring method is as follows.

First, 5 adjacent X electrodes in the front panel are connected to be used as shared electrodes. Secondly, 4 mm×4 mm square Ag electrodes are formed on the dielectric layer. The alternating voltage is then applied to these electrodes while the capacitance C and the loss factor tan δ are measured. The measured C and tan δ values are displayed on the LCR meter. The permittivity $\in$ value is calculated using the Formula 1 above (d=30 μm, S=4 mm×4 mm).

4-3. Measuring Withstand Voltage of Dielectric Layer

The withstand voltage of the dielectric layer was measured on each of the same dielectric layers as those in the PDPs of Examples and Comparative Examples No. 1–75, each dielectric layer for this measurement being formed on a glass substrate. More specifically, each dielectric layer on a glass substrate was sandwiched by two 4 mm×4 mm square Ag electrodes in vertical direction, a direct current was applied to between the two Ag electrodes, and the withstand voltage was measured.

The following tables 1–25 show data of each of Examples No. 1–60 and Comparative Examples No. 61–75.

TABLE 1

| EXAMPLE No. | DIELECTRIC LAYER COMPOSITION (wt %) | | | | | | GLASS SOFTENING POINT (° C.) | GLASS POWDER WEIGHT IN GLASS PASTE (%) | WEIGHT OF BINDER CONTAINING SOLVENT (%) | WEIGHT OF DISPERSANT IN BINDER (%) | WEIGHT OF PLASTICIZER IN BINDER (%) | BAKING TEMP. (° C.) | DIELECTRIC LAYER THICKNESS (μm) | DIELECTRIC LAYER PERMITTIVITY (ε) |
|---|---|---|---|---|---|---|---|---|---|---|---|---|---|---|
| | $P_2O_5$ | ZnO | $B_2O_3$ | $SiO_2$ | MO | $R_2O$ | | | | | | | | |
| 1 | 15 | 20 | 40 | 12 | BaO 3 | $Na_2O$ 10 | 550 | 55 | ETHYL CELLULOSE 45 | HOMOGENOL 0.2 | DIBUTYL PHTHALATE 2.5 | 550 | 30 | 6.4 |
| 2 | 10 | 25 | 35 | 10 | MgO 10 | $K_2O$ 10 | 545 | 65 | ACRYLIC 35 | GLYCEROL MONO-OLEATE 0.2 | DIBUTYL PHTHALATE 2.5 | 550 | 30 | 6.2 |
| 3 | 25 | 35 | 30 | 5 | CaO 3 | $Li_2O$ 2 | 540 | 70 | ETHYLENE OXIDE 30 | SORBITAN SESQUI-OLEATE 0.1 | DIOCTYL PHTHALATE 3.0 | 545 | 30 | 6.3 |
| 4 | 20 | 30 | 40 | 10 | — | — | 560 | 35 | ETHYL CELLULOSE 65 | HOMOGENOL 0.1 | DIOCTYL PHTHALATE 3.0 | 565 | 30 | 6.3 |
| 5 | 20 | 30 | 30 | 10 | SrO 5 | $Cs_2O$ 5 | 550 | 40 | ETHYL CELLULOSE 60 | HOMOGENOL 0.1 | GLYCERIN 2.0 | 553 | 30 | 6.5 |
| 6 | 20 | 30 | 30 | 10 | CaO 5 | $K_2O$ 5 | 555 | 50 | ACRYLIC 50 | GLYCEROL MONO-OLEATE 0.2 | DIOCTYL PHTHALATE 1.5 | 560 | 30 | 6.7 |
| 7 | 20 | 30 | 30 | 10 | CoO 5 | $Rb_2O$ 5 | 545 | 65 | ACRYLIC 35 | HOMOGENOL 0.1 | NONE | 554 | 30 | 6.5 |
| 8 | 20 | 30 | 30 | 10 | NiO 5 | $Ag_2O$ 5 | 553 | 65 | ACRYLIC 35 | HOMOGENOL 0.1 | NONE | 559 | 30 | 6.5 |

TABLE 2

| EXAMPLE No. | DIELECTRIC LAYER COMPOSITION (wt %) | | | | GLASS SOFTENING POINT (° C.) | GLASS POWDER WEIGHT IN GLASS PASTE (%) | WEIGHT OF BINDER CONTAINING SOLVENT (%) | WEIGHT OF DISPERSANT IN BINDER (%) | WEIGHT OF PLASTICIZER IN BINDER (%) | BAKING TEMP. (° C.) | DIELECTRIC LAYER THICKNESS (μm) | DIELECTRIC LAYER PERMITTIVITY (ε) |
|---|---|---|---|---|---|---|---|---|---|---|---|---|
| | $P_2O_5$ | ZnO | $Al_2O_3$ | $Na_2O$ | | | | | | | | |
| 9 | 42 | 40 | 13 | 5 | 520 | 55 | ETHYL CELLULOSE 45 | HOMOGENOL 0.2 | DIBUTYL PHTHALATE 2.5 | 520 | 20 | 6.0 |
| 10 | 63 | 24 | 9 | 4 | 500 | 65 | ACRYLIC 35 | GLYCEROL MONO-OLEATE 0.2 | DIBUTYL PHTHALATE 2.5 | 500 | 15 | 5.9 |
| 11 | 43 | 50 | 7 | — | 550 | 70 | ETHYLENE OXIDE 30 | SORBITAN SESQUI-OLEATE 0.1 | DIOCTYL PHTHALATE 3.0 | 560 | 20 | 5.8 |
| 12 | 50 | 41 | 7 | 2 | 530 | 35 | ETHYL CELLULOSE 65 | HOMOGENOL 0.1 | DIBUTYL PHTHALATE 3.0 | 535 | 15 | 6.2 |

TABLE 2-continued

| EX-AM-PLE No. | DIELECTRIC LAYER COMPOSITION (wt %) | | | | GLASS SOFTENING POINT (° C.) | GLASS POWDER WEIGHT IN GLASS PASTE (%) | WEIGHT OF BINDER CONTAINING SOLVENT (%) | WEIGHT OF DISPERSANT IN BINDER (%) | WEIGHT OF PLASTICIZER IN BINDER (%) | BAKING TEMP. (° C.) | DIELECTRIC LAYER THICKNESS (µm) | DIELECTRIC LAYER PERMITTIVITY (ε) |
|---|---|---|---|---|---|---|---|---|---|---|---|---|
| | $P_2O_5$ | ZnO | $Al_2O_3$ | $Na_2O$ | | | | | | | | |
| 13 | 50 | 35 | 14 | 1 | 520 | 40 | ETHYL CELLULOSE 60 | HOMOGENOL 0.2 | GLYCERIN 2.0 | 525 | 20 | 6.5 |
| 14 | 50 | 39 | 10 | 1 | 515 | 50 | ACRYLIC 50 | GLYCEROL MONO-OLEATE 0.2 | DIOCTYL PHTHALATE 1.5 | 519 | 20 | 6.1 |

TABLE 3

| EX-AM-PLE No. | DIELECTRIC LAYER COMPOSITION (wt %) | | | | | GLASS SOFTENING POINT (° C.) | GLASS POWDER WEIGHT IN GLASS PASTE (%) | WEIGHT OF BINDER CONTAINING SOLVENT (%) | WEIGHT OF DISPERSANT IN BINDER (%) | WEIGHT OF PLASTICIZER IN BINDER (%) | BAKING TEMP. (° C.) | DIELECTRIC LAYER THICKNESS (µm) | DIELECTRIC LAYER PERMITTIVITY (ε) |
|---|---|---|---|---|---|---|---|---|---|---|---|---|---|
| | ZnO | $B_2O_3$ | $SiO_2$ | MO | $R_2O$ | | | | | | | | |
| 15 | 20 | 55 | 5 | MgO 10 | $Li_2O$ 10 | 535 | 55 | ACRYLIC 45 | HOMOGENOL 0.2 | DIOCTYL PHTHALATE 2.0 | 540 | 30 | 6.5 |
| 16 | 30 | 40 | 12 | CaO 10 | $K_2O$ 8 | 540 | 65 | ACRYLIC 35 | GLYCEROL MONO-OLEATE 0.2 | DIBUTYL PHTHALATE 3.0 | 545 | 30 | 6.5 |
| 17 | 35 | 38 | 10 | BaO 10 | $Na_2O$ 7 | 543 | 70 | ETHYL CELLULOSE 30 | SORBITAN SESQUI-OLEATE 0.1 | DIBUTYL PHTHALATE 4.0 | 545 | 30 | 6.5 |
| 18 | 44 | 35 | 10 | SrO 6 | $Cu_2O$ 5 | 540 | 40 | ETHYL CELLULOSE 60 | HOMOGENOL 0.2 | DIBUTYL PHTHALATE 4.0 | 545 | 30 | 6.5 |
| 19 | 40 | 45 | 10 | CaO 3 | $Ag_2O$ 2 | 545 | 45 | ETHYL CELLULOSE 55 | HOMOGENOL 0.2 | DIBUTYL PHTHALATE 4.0 | 550 | 30 | 6.7 |
| 20 | 40 | 50 | 10 | — | — | 558 | 45 | ETHYL CELLULOSE 55 | HOMOGENOL 0.2 | DIBUTYL PHTHALATE 4.0 | 560 | 30 | 6.8 |
| 21 | 40 | 40 | 10 | CaO 5 | $Cs_2O$ 5 | 548 | 50 | ETHYL CELLULOSE 50 | HOMOGENOL 0.2 | DIBUTYL PHTHALATE 4.0 | 550 | 30 | 6.7 |
| 22 | 35 | 47 | 8 | CaO 5 | $Rb_2O$ 5 | 545 | 50 | ETHYL CELLULOSE 50 | HOMOGENOL 0.2 | DIBUTYL PHTHALATE 4.0 | 550 | 30 | 6.4 |

TABLE 4

| EX-AM-PLE No. | DIELECTRIC LAYER COMPOSITION (wt %) | | | | | | GLASS SOFTEN-ING POINT (° C.) | GLASS POWDER WEIGHT IN GLASS PASTE (%) | WEIGHT OF BINDER CON-TAINING SOLVENT (%) | WEIGHT OF DIS-PER-SANT IN BINDER (%) | WEIGHT OF PLAST-ICIZER IN BINDER (%) | BAK-ING TEMP. (° C.) | DIE-LECTRIC LAYER THICK-NESS (μm) | DIE-LECTRIC LAYER PERMIT-TIVITY (ε) |
|---|---|---|---|---|---|---|---|---|---|---|---|---|---|---|
| | ZnO | $B_2O_3$ | $SiO_2$ | $Al_2O_3$ | MO | $R_2O$ | | | | | | | | |
| 23 | 27 | 38 | 10 | 5 | CaO 10 | $Ag_2O$ 10 | 558 | 55 | ACRYLIC 45 | HOMO-GENOL 0.2 | DIBUTYL PHTHA-LATE 2.0 | 560 | 30 | 6.4 |
| 24 | 40 | 40 | 5 | 1 | MgO 7 | $Cu_2O$ 7 | 545 | 65 | ACRYLIC 35 | HOMO-GENOL 0.2 | DIBUTYL PHTHA-LATE 2.0 | 550 | 30 | 6.4 |
| 25 | 20 | 55 | 12 | 2 | SrO 6 | $Na_2O$ 5 | 549 | 70 | ETHYL CELLU-LOSE 30 | HOMO-GENOL 0.2 | DIBUTYL PHTHA-LATE 2.0 | 555 | 30 | 6.3 |
| 26 | 43 | 40 | 5 | 10 | BaO 1 | $K_2O$ 1 | 556 | 65 | ETHYL CELLU-LOSE 35 | HOMO-GENOL 0.2 | DIBUTYL PHTHA-LATE 2.0 | 560 | 30 | 6.3 |
| 27 | 40 | 45 | 5 | 5 | — | $Cs_2O$ 5 | 557 | 65 | ETHYL CELLU-LOSE 35 | HOMO-GENOL 0.2 | DIBUTYL PHTHA-LATE 2.0 | 565 | 30 | 6.3 |
| 28 | 40 | 40 | 5 | 5 | CaO 5 | $Rb_2O$ 5 | 550 | 65 | ETHYL CELLU-LOSE 35 | HOMO-GENOL 0.2 | DIBUTYL PHTHA-LATE 2.0 | 560 | 30 | 6.3 |
| 29 | 42 | 43 | 5 | 5 | CaO 5 | — | 556 | 65 | ETHYL CELLU-LOSE 35 | HOMO-GENOL 0.2 | DIBUTYL PHTHA-LATE 2.0 | 560 | 30 | 6.3 |
| 30 | 32 | 47 | 6 | 4 | CrO 7 | $Ag_2O$ 4 | 550 | 65 | ETHYL CELLU-LOSE 35 | HOMO-GENOL 0.2 | DIBUTYL PHTHA-LATE 2.0 | 560 | 30 | 6.3 |

40

TABLE 5

| EX-AM-PLE No. | DIELECTRIC LAYER COMPOSITION (wt %) | | | | | | GLASS SOFTEN-ING POINT (° C.) | GLASS POWDER WEIGHT IN GLASS PASTE (%) | WEIGHT OF BINDER CON-TAINING SOLVENT (%) | WEIGHT OF DIS-PER-SANT IN BINDER (%) | WEIGHT OF PLAST-ICIZER IN BINDER (%) | BAK-ING TEMP. (° C.) | DIE-LECTRIC LAYER THICK-NESS (μm) | DIE-LECTRIC LAYER PERMIT-TIVITY (ε) |
|---|---|---|---|---|---|---|---|---|---|---|---|---|---|---|
| | $B_2O_3$ | $SiO_2$ | ZnO | $Al_2O_3$ | $Li_2O$ | MO | | | | | | | | |
| 31 | 20 | 30 | 15 | 20 | 10 | MgO 5 | 580 | 55 | ACRYLIC 45 | HOMO-GENOL 0.2 | DIBUTYL PHTHA-LATE 2.0 | 595 | 30 | 6.7 |
| 32 | 40 | 10 | 15 | 25 | 3 | CaO 7 | 565 | 60 | ETHYL CELLU-LOSE 40 | GLY-CEROL MONO-OLEATE 0.2 | DIBUTYL PHTHA-LATE 2.0 | 575 | 30 | 6.4 |
| 33 | 35 | 25 | 10 | 20 | 8 | BaO 2 | 574 | 60 | ETHYL CELLU-LOSE 40 | SOR-BITAN SESQUI-OLEATE 0.2 | DIBUTYL PHTHA-LATE 2.0 | 580 | 30 | 6.6 |

TABLE 5-continued

| EX-AM-PLE No. | DIELECTRIC LAYER COMPOSITION (wt %) | | | | | | GLASS SOFTEN-ING POINT (° C.) | GLASS POWDER WEIGHT IN GLASS PASTE (%) | WEIGHT OF BINDER CON-TAINING SOLVENT (%) | WEIGHT OF DIS-PER-SANT IN BINDER (%) | WEIGHT OF PLAST-ICIZER IN BINDER (%) | BAK-ING TEMP. (° C.) | DIE-LECTRIC LAYER THICK-NESS (μm) | DIE-LECTRIC LAYER PERMIT-TIVITY (ε) |
|---|---|---|---|---|---|---|---|---|---|---|---|---|---|---|
| | $B_2O_3$ | $SiO_2$ | ZnO | $Al_2O_3$ | $Li_2O$ | MO | | | | | | | | |
| 34 | 35 | 30 | 10 | 5 | 10 | SrO 10 | 560 | 60 | ETHYL CELLULOSE 40 | HOMO-GENOL 0.2 | DIBUTYL PHTHALATE 2.0 | 570 | 30 | 6.5 |
| 35 | 40 | 25 | 1 | 19 | 5 | CaO 10 | 575 | 70 | ETHYL CELLULOSE 30 | HOMO-GENOL 0.2 | DIBUTYL PHTHALATE 2.0 | 585 | 30 | 6.5 |
| 36 | 30 | 20 | 15 | 20 | 5 | CaO 10 | 565 | 70 | ETHYL CELLULOSE 30 | HOMO-GENOL 0.2 | DIBUTYL PHTHALATE 2.0 | 575 | 30 | 6.5 |
| 37 | 30 | 15 | 10 | 25 | 8 | BaO 12 | 563 | 70 | ETHYL CELLULOSE 30 | HOMO-GENOL 0.2 | DIBUTYL PHTHALATE 2.0 | 575 | 30 | 6.7 |
| 38 | 30 | 15 | 10 | 20 | 10 | 15 | 562 | 70 | ETHYL CELLULOSE 30 | HOMO-GENOL 0.2 | DIBUTYL PHTHALATE 2.0 | 575 | 30 | 6.5 |

TABLE 6

| EX-AM-PLE No. | DIELECTRIC LAYER COMPOSITION (wt %) | | | | | GLASS SOFTEN-ING POINT (° C.) | GLASS POWDER WEIGHT IN GLASS PASTE (%) | WEIGHT OF BINDER CON-TAINING SOLVENT (%) | WEIGHT OF DIS-PERSANT IN BINDER (%) | WEIGHT OF PLAST-ICIZER IN BINDER (%) | BAK-ING TEMP. (° C.) | DIE-LECTRIC LAYER THICK-NESS (μm) | DIE-LECTRIC LAYER PERMIT-TIVITY (ε) |
|---|---|---|---|---|---|---|---|---|---|---|---|---|---|
| | ZnO | $B_2O_3$ | $SiO_2$ | $Al_2O_3$ | $Na_2O$ | | | | | | | | |
| 39 | 44 | 35 | 10.5 | 5.5 | 5 | 540 | 55 | ACRYLIC 45 | HOMO-GENOL 0.2 | DIOCTYL PHTHALATE 2.0 | 545 | 20 | 6.5 |
| 40 | 35 | 45 | 10 | 6 | 4 | 549 | 65 | ACRYLIC 35 | GLYCEROL MONO-OLEATE 0.2 | DIBUTYL PHTHALATE 3.0 | 550 | 15 | 6.3 |
| 41 | 50 | 40 | 1 | 5 | 4 | 543 | 70 | ETHYL CELLULOSE 30 | SORBITAN SESQUI-OLEATE 0.1 | DIBUTYL PHTHALATE 4.0 | 549 | 15 | 6.4 |
| 42 | 60 | 30 | 5 | 1 | 4 | 542 | 40 | ETHYL CELLULOSE 60 | HOMO-GENOL 0.2 | DIBUTYL PHTHALATE 4.0 | 548 | 15 | 6.5 |
| 43 | 50 | 30 | 10 | 10 | — | 549 | 45 | ETHYL CELLULOSE 55 | HOMO-GENOL 0.2 | DIBUTYL PHTHALATE 4.0 | 555 | 15 | 6.7 |
| 44 | 50 | 25 | 10 | 10 | 5 | 545 | 45 | ETHYL CELLULOSE 55 | HOMO-GENOL 0.2 | DIBUTYL PHTHALATE 4.0 | 549 | 20 | 6.8 |

TABLE 7

| EX-AM-PLE No. | DIELECTRIC LAYER COMPOSITION (wt %) | | | | | GLASS SOFTEN-ING POINT (° C.) | GLASS POWDER WEIGHT IN GLASS PASTE (%) | WEIGHT OF BINDER CON-TAINING SOLVENT (%) | WEIGHT OF DIS-PERSANT IN BINDER (%) | WEIGHT OF PLAST-ICIZER IN BINDER (%) | BAK-ING TEMP. (° C.) | DIE-LECTRIC LAYER THICK-NESS ($\mu$m) | DIE-LECTRIC LAYER PERMIT-TIVITY ($\epsilon$) |
|---|---|---|---|---|---|---|---|---|---|---|---|---|---|
| | ZnO | $B_2O_3$ | $SiO_2$ | $Al_2O_3$ | $Ka_2O$ | | | | | | | | |
| 45 | 60 | 30 | 5 | 1 | 4 | 548 | 55 | ACRYLIC 45 | HOMO-GENOL 0.2 | DIBUTYL PHTHALATE 2.0 | 550 | 20 | 6.5 |
| 46 | 60 | 30 | 7 | 1 | 2 | 543 | 65 | ACRYLIC 35 | HOMO-GENOL 0.2 | DIBUTYL PHTHALATE 2.0 | 549 | 20 | 6.5 |
| 47 | 35 | 45 | 10 | 10 | — | 549 | 70 | ETHYL CELLULOSE 30 | HOMO-GENOL 0.2 | DIBUTYL PHTHALATE 2.0 | 552 | 20 | 6.4 |
| 48 | 50 | 29 | 10 | 10 | 1 | 545 | 65 | ETHYL CELLULOSE 35 | HOMO-GENOL 0.2 | DIBUTYL PHTHALATE 2.0 | 555 | 20 | 6.4 |
| 49 | 50 | 25 | 12 | 10 | 3 | 550 | 65 | ETHYL CELLULOSE 35 | HOMO-GENOL 0.2 | DIBUTYL PHTHALATE 2.0 | 554 | 20 | 6.4 |
| 50 | 50 | 25 | 10 | 10 | 5 | 548 | 65 | ETHYL CELLULOSE 35 | HOMO-GENOL 0.2 | DIBUTYL PHTHALATE 2.0 | 550 | 20 | 6.4 |

TABLE 8

| EX-AM-PLE No. | DIELECTRIC LAYER COMPOSITION (wt %) | | | | | GLASS SOFTEN-ING POINT (° C.) | GLASS POWDER WEIGHT IN GLASS PASTE (%) | WEIGHT OF BINDER CON-TAINING SOLVENT (%) | WEIGHT OF DIS-PERSANT IN BINDER (%) | WEIGHT OF PLAST-ICIZER IN BINDER (%) | BAK-ING TEMP. (° C.) | DIE-LECTRIC LAYER THICK-NESS ($\mu$m) | DIE-LECTRIC LAYER PERMIT-TIVITY ($\epsilon$) |
|---|---|---|---|---|---|---|---|---|---|---|---|---|---|
| | $Nb_2O_5$ | ZnO | $B_2O_3$ | $SiO_2$ | $Li_2O$ | | | | | | | | |
| 51 | 19 | 44 | 30 | 7 | — | 550 | 55 | ACRYLIC 45 | HOMO-GENOL 0.2 | DIBUTYL PHTHALATE 2.0 | 555 | 20 | 6.8 |
| 52 | 9 | 60 | 25 | 1 | 5 | 554 | 60 | ETHYL CELLULOSE 40 | GLYCEROL MONO-OLEATE 0.2 | DIBUTYL PHTHALATE 2.0 | 560 | 20 | 6.5 |
| 53 | 14.5 | 35 | 38 | 10.5 | 2 | 556 | 60 | ETHYL CELLULOSE 40 | SORBITAN SESQUI-OLEATE 0.1 | DIBUTYL PHTHALATE 2.0 | 565 | 20 | 6.6 |
| 54 | 15 | 50 | 20 | 10 | 5 | 555 | 60 | ETHYL CELLULOSE 40 | HOMO-GENOL 0.2 | DIBUTYL PHTHALATE 2.0 | 565 | 20 | 6.7 |

TABLE 9

| EXAMPLE No. | DIELECTRIC LAYER COMPOSITION (wt %) | | | | | GLASS SOFTENING POINT (° C.) | GLASS POWDER WEIGHT IN GLASS PASTE (%) | WEIGHT OF BINDER CONTAINING SOLVENT (%) | WEIGHT OF DISPERSANT IN BINDER (%) | WEIGHT OF PLASTICIZER IN BINDER (%) | BAKING TEMP. (° C.) | DIELECTRIC LAYER THICKNESS ($\mu$m) | DIELECTRIC LAYER PERMITTIVITY ($\epsilon$) |
|---|---|---|---|---|---|---|---|---|---|---|---|---|---|
| | PbO | $B_2O_3$ | $SiO_2$ | CaO | $Al_2O_3$ | | | | | | | | |
| 55 | 50 | 25 | 15 | 10 | — | 560 | 55 | ETHYL CELLULOSE 45 | SORBITAN SESQUI-OLEATE 0.1 | DIOCTYL PHTHALATE 2.0 | 580 | 5 | 10.5 |
| 56 | 65 | 10 | 22 | 1 | 2 | 550 | 65 | ACRYLIC 40 | GLYCEROL MONO-OLEATE 0.2 | DIBUTYL PHTHALATE 2.0 | 560 | 5 | 11.0 |
| 57 | 45 | 30 | 20 | 5 | — | 570 | 70 | ETHYL CELLULOSE 30 | HOMO-GENOL 0.2 | DIBUTYL PHTHALATE 2.0 | 590 | 5 | 10.8 |
| 58 | $SiO_2$ FILM BY SPUTTERING | | | | | — | — | — | — | — | — | 5 | 4.0 |
| 59 | $Al_2O_3$ FILM BY SPUTTERING | | | | | — | — | — | — | — | — | 2 | 9.0 |
| 60 | ZnO FILM BY SPUTTERING | | | | | — | — | — | — | — | — | 2 | 7.0 |

TABLE 10

| EXAMPLE No. | DIELECTRIC LAYER COMPOSITION (wt %) | | | | | GLASS SOFTENING POINT (° C.) | GLASS POWDER WEIGHT IN GLASS PASTE (%) | WEIGHT OF BINDER CONTAINING SOLVENT (%) | WEIGHT OF DISPERSANT IN BINDER (%) | WEIGHT OF PLASTICIZER IN BINDER (%) | BAKING TEMP. (° C.) | DIELECTRIC LAYER THICKNESS ($\mu$m) | DIELECTRIC LAYER PERMITTIVITY ($\epsilon$) |
|---|---|---|---|---|---|---|---|---|---|---|---|---|---|
| 55 | ZnO 20 | $B_2O_3$ 55 | $SiO_2$ 5 | MgO 10 | $Li_2O$ 10 | 535 | 55 | ACRYLIC 45 | HOMO-GENOL 0.2 | DIOCTYL PHTHALATE 2.0 | 545 | 25 | 6.5 |
| 56 | $P_2O_5$ 20 | ZnO 30 | $B_2O_3$ 40 | $SiO_2$ 10 | — | 560 | 35 | ETHYL CELLULOSE 65 | HOMO-GENOL 0.1 | DIBUTYL PHTHALATE 3.0 | 565 | 25 | 6.3 |
| 57 | ZnO 40 | $B_2O_3$ 45 | $SiO_2$ 5 | $Al_2O_3$ 5 | $Cs_2O$ 5 | 557 | 65 | ETHYL CELLULOSE 35 | HOMO-GENOL 0.2 | DIBUTYL PHTHALATE 2.0 | 565 | 25 | 6.3 |
| 58 | ZnO 42 | $B_2O_3$ 43 | $SiO_2$ 5 | $Al_2O_3$ 5 | $Cs_2O$ 5 | 556 | 65 | ETHYL CELLULOSE 35 | HOMO-GENOL 0.2 | DIBUTYL PHTHALATE 2.0 | 565 | 25 | 6.3 |
| 59 | ZnO 30 | $B_2O_3$ 45 | $SiO_2$ 5 | CaO 10 | $K_2O$ 10 | 540 | 60 | ETHYL CELLULOSE 40 | POLYOXY-ETHYLENE MONO-OLEATE 0.2 | DIBUTYL PHTHALATE 2.0 | 550 | 28 | 6.4 |
| 60 | ZnO 30 | $B_2O_3$ 45 | $SiO_2$ 5 | CaO 10 | $K_2O$ 10 | 540 | 60 | ETHYL CELLULOSE 40 | POLYOXY-ETHYLENE MONO-OLEATE 0.2 | DIBUTYL PHTHALATE 2.0 | 550 | 28 | 6.4 |

TABLE 11

| EXAMPLE No. | DIELECTRIC LAYER COMPOSITION (wt %) | | | | | GLASS SOFTENING POINT (°C.) | GLASS POWDER WEIGHT IN GLASS PASTE (%) | WEIGHT OF BINDER CONTAINING SOLVENT (%) | WEIGHT OF DISPERSANT IN BINDER (%) | WEIGHT OF PLASTICIZER IN BINDER (%) | BAKING TEMP. (°C.) | DIELECTRIC LAYER THICKNESS (μm) | DIELECTRIC LAYER PERMITTIVITY (ε) |
|---|---|---|---|---|---|---|---|---|---|---|---|---|---|
| | $Bi_2O_3$ | ZnO | $B_2O_3$ | $SiO_2$ | CaO | | | | | | | | |
| 61* | 35 | 25 | 26 | 10 | 4 | 580 | 55 | ACRYLIC 45 | HOMOGENOL 0.2 | DIBUTYL PHTHALATE 2.0 | 590 | 30 | 12.0 |
| 62* | 45 | 30 | 15 | 7 | 3 | 550 | 60 | ETHYL CELLULOSE 40 | HOMOGENOL 0.2 | DIBUTYL PHTHALATE 2.0 | 575 | 30 | 12.5 |
| 63* | 37 | 28 | 20 | 5 | 10 | 570 | 35 | ETHYL CELLULOSE 65 | SORBITAN SESQUIOLEATE 0.2 | DIOCTYL PHTHALATE 2.0 | 575 | 30 | 11.8 |
| 64* | 35 | 30 | 17 | 10 | 8 | 575 | 40 | ETHYL CELLULOSE 60 | SORBITAN SESQUIOLEATE 0.2 | DIOCTYL PHTHALATE 2.0 | 575 | 30 | 11.4 |
| 65* | $Na_2O$ 15 | 20 | 55 | 5 | 5 | 530 | 60 | ETHYL CELLULOSE 40 | SORBITAN SESQUIOLEATE 0.2 | DIBUTYL PHTHALATE 2.0 | 535 | 30 | 6.4 |
| 66* | $Na_2O$ 20 | 30 | 30 | 10 | 10 | 525 | 60 | ETHYL CELLULOSE 40 | SORBITAN SESQUIOLEATE 0.2 | DIBUTYL PHTHALATE 2.0 | 530 | 30 | 6.5 |
| 67* | $Na_2O$ 25 | 35 | 40 | — | — | 560 | 60 | ETHYL CELLULOSE 40 | SORBITAN SESQUIOLEATE 0.2 | DIBUTYL PHTHALATE 2.0 | 570 | 30 | 6.7 |

*No. 61~67は比較例

TABLE 12

| EXAMPLE No. | DIELECTRIC LAYER COMPOSITION (wt %) | | | | | GLASS SOFTENING POINT (°C.) | GLASS POWDER WEIGHT IN GLASS PASTE (%) | WEIGHT OF BINDER CONTAINING SOLVENT (%) | WEIGHT OF DISPERSANT IN BINDER (%) | WEIGHT OF PLASTICIZER IN BINDER (%) | BAKING TEMP. (°C.) | DIELECTRIC LAYER THICKNESS (μm) | DIELECTRIC LAYER PERMITTIVITY (ε) |
|---|---|---|---|---|---|---|---|---|---|---|---|---|---|
| | PbO | $B_2O_3$ | $SiO_2$ | CaO | $Al_2O_3$ | | | | | | | | |
| 68* | 50 | 25 | 15 | 10 | 0 | 560 | 55 | ETHYL CELLULOSE 45 | SORBITAN SESQUIOLEATE 0.2 | DIOCTYL PHTHALATE 2.0 | 580 | 20 | 10.5 |
| 69* | 65 | 10 | 22 | 1 | 2 | 550 | 65 | ACRYLIC 40 | GLYCEROL MONOOLEATE 0.2 | DIBUTYL PHTHALATE 2.0 | 560 | 20 | 11.0 |
| 70* | 45 | 30 | 20 | 5 | 0 | 570 | 70 | ETHYL CELLULOSE 30 | HOMOGENOL 0.2 | DIBUTYL PHTHALATE 2.0 | 590 | 20 | 10.8 |
| 71* | 55 | 10 | 30 | 5 | 0 | 575 | 35 | ETHYL CELLULOSE 65 | GLYCEROL MONOOLEATE 0.2 | DIBUTYL PHTHALATE 2.0 | 590 | 20 | 10.7 |

*No. 68–71 ARE COMPARATIVE EXAMPLES

TABLE 13

| EXAMPLE No. | DIELECTRIC LAYER COMPOSITION (wt %) | | | | | GLASS SOFTENING POINT (° C.) | GLASS POWDER WEIGHT IN GLASS PASTE (%) | WEIGHT OF BINDER CONTAINING SOLVENT (%) | WEIGHT OF DISPERSANT IN BINDER (%) | WEIGHT OF PLASTICIZER IN BINDER (%) | BAKING TEMP. (° C.) | DIELECTRIC LAYER THICKNESS (μm) | DIELECTRIC LAYER PERMITTIVITY (ε) |
|---|---|---|---|---|---|---|---|---|---|---|---|---|---|
| | Bi$_2$O$_3$ | ZnO | B$_2$O$_3$ | SiO$_2$ | CaO | | | | | | | | |
| 72* | 35 | 25 | 25 | 10 | 5 | 580 | 55 | ACRYLIC 45 | HOMOGENOL 0.2 | DIBUTYL PHTHALATE 2.0 | 590 | 15 | 12.0 |
| 73* | 45 | 30 | 15 | 7 | 3 | 550 | 60 | ETHYL CELLULOSE 40 | HOMOGENOL 0.2 | DIBUTYL PHTHALATE 2.0 | 575 | 15 | 12.5 |
| 74* | 37 | 28 | 20 | 5 | 10 | 570 | 35 | ETHYL CELLULOSE 65 | SORBITAN SESQUIOLEATE 0.2 | DIOCTYL PHTHALATE 2.0 | 575 | 15 | 11.8 |
| 75* | 35 | 30 | 17 | 10 | 8 | 575 | 40 | ETHYL CELLULOSE 60 | SORBITAN SESQUIOLEATE 0.2 | DIOCTYL PHTHALATE 2.0 | 575 | 15 | 11.4 |

*No. 72–75 ARE COMPARATIVE EXAMPLES

TABLE 14

| EXAMPLE No. | DIELECTRIC LAYER DISCOLORING | PANEL BRIGHTNESS (cd/m$^2$) | PANEL POWER CONSUMPTION (W) | LOSS FACTOR tan δ (10 KHz) | ε tan δ | DIELECTRIC LAYER WITHSTAND VOLTAGE (kV) |
|---|---|---|---|---|---|---|
| 1 | NO DISCOLORING | 550 | 485 | 0.010 | 0.064 | 5.0 |
| 2 | NO DISCOLORING | 552 | 480 | 0.008 | 0.050 | 5.2 |
| 3 | NO DISCOLORING | 541 | 472 | 0.009 | 0.057 | 5.3 |
| 4 | NO DISCOLORING | 540 | 490 | 0.009 | 0.057 | 5.3 |
| 5 | NO DISCOLORING | 542 | 520 | 0.011 | 0.072 | 5.0 |
| 6 | NO DISCOLORING | 547 | 450 | 0.015 | 0.101 | 4.6 |
| 7 | NO DISCOLORING | 537 | 485 | 0.013 | 0.085 | 4.8 |
| 8 | NO DISCOLORING | 540 | 490 | 0.014 | 0.091 | 4.7 |

TABLE 15

| EXAMPLE No. | DIELECTRIC LAYER DISCOLORING | PANEL BRIGHTNESS (cd/m$^2$) | PANEL POWER CONSUMPTION (W) | LOSS FACTOR tan δ (10 KHz) | ε tan δ | DIELECTRIC LAYER WITHSTAND VOLTAGE (kV) |
|---|---|---|---|---|---|---|
| 9 | NO DISCOLORING | 565 | 491 | 0.015 | 0.090 | 4.5 |
| 10 | NO DISCOLORING | 562 | 483 | 0.014 | 0.083 | 3.9 |
| 11 | NO DISCOLORING | 551 | 475 | 0.009 | 0.052 | 4.6 |
| 12 | NO DISCOLORING | 548 | 507 | 0.012 | 0.074 | 3.8 |
| 13 | NO DISCOLORING | 557 | 532 | 0.010 | 0.065 | 4.6 |
| 14 | NO DISCOLORING | 558 | 499 | 0.009 | 0.055 | 4.7 |

TABLE 16

| EXAMPLE No. | DIELECTRIC LAYER DISCOLORING | PANEL BRIGHTNESS (cd/m$^2$) | PANEL POWER CONSUMPTION (W) | LOSS FACTOR tan δ (10 KHz) | ε tan δ | DIELECTRIC LAYER WITHSTAND VOLTAGE (kV) |
|---|---|---|---|---|---|---|
| 15 | NO DISCOLORING | 560 | 498 | 0.014 | 0.091 | 4.7 |
| 16 | NO DISCOLORING | 554 | 458 | 0.015 | 0.098 | 4.6 |
| 17 | NO DISCOLORING | 545 | 468 | 0.015 | 0.098 | 4.6 |
| 18 | NO DISCOLORING | 538 | 495 | 0.013 | 0.085 | 4.7 |
| 19 | NO DISCOLORING | 540 | 515 | 0.015 | 0.101 | 4.6 |
| 20 | NO DISCOLORING | 552 | 529 | 0.017 | 0.116 | 4.5 |
| 21 | NO DISCOLORING | 548 | 513 | 0.013 | 0.087 | 4.8 |
| 22 | NO DISCOLORING | 545 | 508 | 0.010 | 0.064 | 5.0 |

TABLE 17

| EXAMPLE No. | DIELECTRIC LAYER DISCOLORING | PANEL BRIGHTNESS (cd/m²) | PANEL POWER CONSUMPTION (W) | LOSS FACTOR tan δ (10 KHz) | ε tan δ | DIELECTRIC LAYER WITHSTAND VOLTAGE (kV) |
|---|---|---|---|---|---|---|
| 23 | NO DISCOLORING | 520 | 505 | 0.012 | 0.077 | 4.9 |
| 24 | NO DISCOLORING | 505 | 500 | 0.013 | 0.083 | 4.8 |
| 25 | NO DISCOLORING | 510 | 498 | 0.009 | 0.057 | 5.2 |
| 26 | NO DISCOLORING | 522 | 490 | 0.010 | 0.063 | 5.1 |
| 27 | NO DISCOLORING | 538 | 485 | 0.010 | 0.063 | 5.1 |
| 28 | NO DISCOLORING | 542 | 487 | 0.010 | 0.063 | 5.1 |
| 29 | NO DISCOLORING | 526 | 488 | 0.010 | 0.063 | 5.1 |
| 30 | NO DISCOLORING | 525 | 489 | 0.010 | 0.063 | 5.1 |

TABLE 18

| EXAMPLE No. | DIELECTRIC LAYER DISCOLORING | PANEL BRIGHTNESS (cd/m²) | PANEL POWER CONSUMPTION (W) | LOSS FACTOR tan δ (10 KHz) | ε tan δ | DIELECTRIC LAYER WITHSTAND VOLTAGE (kV) |
|---|---|---|---|---|---|---|
| 31 | NO DISCOLORING | 550 | 538 | 0.015 | 0.101 | 4.5 |
| 32 | NO DISCOLORING | 554 | 520 | 0.011 | 0.070 | 5.0 |
| 33 | NO DISCOLORING | 545 | 531 | 0.013 | 0.085 | 4.8 |
| 34 | NO DISCOLORING | 553 | 533 | 0.014 | 0.092 | 4.8 |
| 35 | NO DISCOLORING | 532 | 535 | 0.014 | 0.092 | 4.7 |
| 36 | NO DISCOLORING | 527 | 525 | 0.014 | 0.092 | 4.7 |
| 37 | NO DISCOLORING | 534 | 520 | 0.015 | 0.101 | 4.6 |
| 38 | NO DISCOLORING | 550 | 530 | 0.013 | 0.085 | 4.9 |

TABLE 19

| EXAMPLE No. | DIELECTRIC LAYER DISCOLORING | PANEL BRIGHTNESS (cd/m²) | PANEL POWER CONSUMPTION (W) | LOSS FACTOR tan δ (10 KHz) | ε tan δ | DIELECTRIC LAYER WITHSTAND VOLTAGE (kV) |
|---|---|---|---|---|---|---|
| 39 | NO DISCOLORING | 570 | 532 | 0.013 | 0.085 | 4.4 |
| 40 | NO DISCOLORING | 560 | 515 | 0.012 | 0.076 | 3.5 |
| 41 | NO DISCOLORING | 555 | 624 | 0.014 | 0.090 | 3.5 |
| 42 | NO DISCOLORING | 550 | 532 | 0.012 | 0.078 | 3.6 |
| 43 | NO DISCOLORING | 549 | 548 | 0.090 | 0.060 | 3.7 |
| 44 | NO DISCOLORING | 560 | 556 | 0.013 | 0.088 | 4.5 |

TABLE 20

| EXAMPLE No. | DIELECTRIC LAYER DISCOLORING | PANEL BRIGHTNESS (cd/m²) | PANEL POWER CONSUMPTION (W) | LOSS FACTOR tan δ (10 KHz) | ε tan δ | DIELECTRIC LAYER WITHSTAND VOLTAGE (kV) |
|---|---|---|---|---|---|---|
| 45 | NO DISCOLORING | 533 | 532 | 0.011 | 0.072 | 4.7 |
| 46 | NO DISCOLORING | 516 | 532 | 0.009 | 0.059 | 4.8 |
| 47 | NO DISCOLORING | 524 | 525 | 0.007 | 0.045 | 4.9 |
| 48 | NO DISCOLORING | 532 | 523 | 0.008 | 0.051 | 4.8 |
| 49 | NO DISCOLORING | 549 | 522 | 0.009 | 0.058 | 4.7 |
| 50 | NO DISCOLORING | 556 | 523 | 0.012 | 0.077 | 4.6 |

TABLE 21

| EXAMPLE No. | DIELECTRIC LAYER DISCOLORING | PANEL BRIGHTNESS (cd/m²) | PANEL POWER CONSUMPTION (W) | LOSS FACTOR tan δ (10 KHz) | ε tan δ | DIELECTRIC LAYER WITHSTAND VOLTAGE (kV) |
|---|---|---|---|---|---|---|
| 51 | NO DISCOLORING | 562 | 556 | 0.007 | 0.048 | 4.9 |
| 52 | NO DISCOLORING | 569 | 532 | 0.011 | 0.072 | 4.7 |
| 53 | NO DISCOLORING | 564 | 540 | 0.009 | 0.059 | 4.8 |
| 54 | NO DISCOLORING | 568 | 549 | 0.013 | 0.087 | 4.6 |

TABLE 22

| Example No. | Dielectric Layer Discoloring | Panel Brightness (cd/m²) | Panel Power Consumption (W) | Loss Factor tan δ (10 KHz) | ε tan δ | Dielectric Layer Withstand Voltage (kV) |
|---|---|---|---|---|---|---|
| 55 | NO DISCOLORING | 560 | 520 | 0.015 | 0.103 | 4.5 |
| 56 | NO DISCOLORING | 558 | 535 | 0.013 | 0.090 | 4.8 |
| 57 | NO DISCOLORING | 550 | 525 | 0.013 | 0.086 | 4.8 |
| 58 | NO DISCOLORING | 546 | 485 | 0.013 | 0.078 | 4.8 |
| 59 | NO DISCOLORING | 549 | 535 | 0.014 | 0.100 | 4.8 |
| 60 | NO DISCOLORING | 549 | 530 | 0.013 | 0.095 | 4.8 |

TABLE 23

| Example No. | Dielectric Layer Discoloring | Panel Brightness (cd/m²) | Panel Power Consumption (W) | Loss Factor tan δ (10 KHz) | ε tan δ | Dielectric Layer Withstand Voltage (kV) |
|---|---|---|---|---|---|---|
| 61* | YELLOWING | 530 | 830 | 0.024 | 0.288 | 3.0 |
| 62* | YELLOWING | 545 | 902 | 0.025 | 0.313 | 2.9 |
| 63* | YELLOWING | 550 | 850 | 0.023 | 0.271 | 3.1 |
| 64* | YELLOWING | 551 | 832 | 0.022 | 0.251 | 3.2 |
| 65* | YELLOWING | 530 | 690 | 0.102 | 0.653 | 3.0 |
| 66* | YELLOWING | 540 | 685 | 0.105 | 0.683 | 2.5 |
| 67* | YELLOWING | 542 | 680 | 0.112 | 0.750 | 2.1 |

*No. 61–67 ARE COMPARATIVE EXAMPLES

TABLE 24

| Example No. | Dielectric Layer Discoloring | Panel Brightness (cd/m²) | Panel Power Consumption (W) | Loss Factor tan δ (10 KHz) | ε tan δ | Dielectric Layer Withstand Voltage (kV) |
|---|---|---|---|---|---|---|
| 68* | NO DISCOLORING | 564 | 890 | 0.015 | 0.158 | 3.0 |
| 69* | NO DISCOLORING | 560 | 900 | 0.013 | 0.143 | 3.1 |
| 70* | NO DISCOLORING | 550 | 884 | 0.013 | 0.140 | 3.1 |
| 71* | NO DISCOLORING | 545 | 875 | 0.014 | 0.150 | 3.2 |

*No. 68–71 ARE COMPARATIVE EXAMPLES

TABLE 25

| Example No. | Dielectric Layer Discoloring | Panel Brightness (cd/m²) | Panel Power Consumption (W) | Loss Factor tan δ (10 KHz) | ε tan δ | Dielectric Layer Withstand Voltage (kV) |
|---|---|---|---|---|---|---|
| 72* | SLIGHT YELLOWING | 543 | 981 | 0.024 | 0.288 | 2.5 |
| 73* | SLIGHT YELLOWING | 559 | 1,023 | 0.025 | 0.313 | 2.4 |
| 74* | SLIGHT YELLOWING | 560 | 965 | 0.023 | 0.271 | 2.8 |
| 75* | SLIGHT YELLOWING | 562 | 933 | 0.022 | 0.251 | 2.9 |

*No. 72–75 ARE COMPARATIVE EXAMPLES

5. Performance Evaluation for Examples 5-1. Permittivity ∈

It is confirmed from Table 1 that permittivity ∈ values (∈=6.2 to 6.7) that are excellent for achieving small power consumption are obtained with the $ZnO$—$P_2O_5$-base glasses (No. 1–8). The $ZnO$—$P_2O_5$-base glasses in Examples No. 1–8 are variations having the glass composition of the dielectric layer in Embodiment 1. According to Examples No. 3 and 5–8, to obtain the effects of the present invention, it is desirable that the glass is composed of 10–25 wt % of $P_2O_5$, 20–35 wt % of $ZnO$, 30–55 wt % of $B_2O_3$, 5–12 wt % of $SiO_2$, 10 wt % or less of DO, and 10 wt % or less of $R_2O$, where R is Li, Na, K, Rb, Cs, Cu, or Ag, and D is Mg, Ca, Ba, Sr, Co, Cr, or Ni. It should be noted here that it has been confirmed through another experiment that Cu and Cr can be used as DO and $R_2O$, respectively, in the above definition.

With regard to Example No. 4 that does not include $R_2O$, it is considered that similar performance will be obtained even if the composition shown in Table 1 is slightly changed in the following ranges: 20–30 wt % of $P_2O_5$, 30–40 wt % of $ZnO$, 30–45 wt % of $B_2O_3$, and 1–10 wt % of $SiO_2$.

It is confirmed from Table 2 that satisfactory results are obtained from the $ZnO$—$P_2O_5$-base glasses (No. 9–14) with excellent permittivity ∈ values (∈=5.8 to 6.5). According to Examples No. 9–14, it is desirable that the glass is composed of 42–50 wt % of $P_2O_5$, 35–50 wt % of $ZnO$, 7–14 wt % of $Al_2O_3$, and 5 wt % or less of $Na_2O$.

It is confirmed from Table 3 that satisfactory results are obtained from the $ZnO$-base glasses (No. 15–22) with excellent permittivity ∈ values (∈=6.4 to 6.8). According to Examples No. 15–22, it is desirable that the glass is composed of 20–44 wt % of $ZnO$, 38–55 wt % of $B_2O_3$, 5–12 wt % of $SiO_2$, 10 wt % or less of $R_2O$, and 10 wt % or less of MO, where R is Li, Na, K, Rb, Cs, Cu, or Ag, and M is Mg, Ca, Ba, Sr, Co, or Cr. It should be noted here that it has been confirmed through another experiment that Co and Cr can be used as MO in the above definition.

With regard to Example No. 20 that does not include $R_2O$, it is considered that similar performance will be obtained even if the composition shown in Table 3 is slightly changed in the following ranges: 30–40 wt % of $ZnO$, 40–60 wt % of $B_2O_3$, and 1–15 wt % of $SiO_2$.

It is confirmed from Table 4 that satisfactory results are obtained from the ZnO-base glasses (No. 23–30) with excellent permittivity $\in$ values ($\in$=6.3 to 6.4). According to Examples No. 23–30, it is desirable that the glass is composed of 20–43 wt % of ZnO, 38–55 wt % of $B_2O_3$, 5–12 wt % of $SiO_2$, 1–10 wt % of $Al_2O_3$, 10 wt % or less of $R_2O$, and 10 wt % or less of MO, where R is Li, Na, K, Rb, Cs, Cu, or Ag, and M is Mg, Ca, Ba, Sr, Co, or Cr. It should be noted here that though not shown in Table 4, it has been confirmed through another experiment that Co can be used as MO in the above definition.

With regard to Example No. 29 that does not include $R_2O$, it is considered that similar performance will be obtained even if the composition shown in Table 4 is slightly changed in the following ranges: 30–45 wt % of ZnO, 40–55 wt % of $B_2O_3$, 1–10 wt % of $SiO_2$, 1–10 wt % of $Al_2O_3$, and 1–5 wt % of CaO.

It is confirmed from Table 5 that satisfactory results are obtained from the ZnO-base glasses (No. 31–38) with excellent permittivity $\in$ values ($\in$=6.4 to 6.7). According to Examples No. 31–38, it is desirable that the glass is composed of 1–15 wt % of ZnO, 20–40 wt % of $B_2O_3$, 10–30 wt % of $SiO_2$, 5–25 wt % of $Al_2O_3$, 3–10 wt % of $Li_2O$, and 2–15 wt % of MO, where M is Mg, Ca, Ba, Sr, Co, or Cr. It should be noted here that though not shown in Table 5, it has been confirmed through another experiment that each of Co and Cr can be used as MO in the above definition.

It is confirmed from Table 6 that satisfactory results are obtained from the ZnO-base glasses (No. 39–44) with excellent permittivity $\in$ values ($\in$=6.3 to 6.8). According to Examples No. 39–44, it is desirable that the glass is composed of 35–60 wt % of ZnO, 25–45 wt % of $B_2O_3$, 1–10.5 wt % of $SiO_2$, 1–10 wt % of $Al_2O_3$, and 5 wt % or less of $Na_2O$.

With regard to Example No. 43 that does not include $R_2O$ (in this case, $Na_2O$), it is considered that similar performance will be obtained even if the composition shown in Table 6 is slightly changed in the following ranges: 40–60 wt % of ZnO, 35–45 wt % of $B_2O_3$, 1–10 wt % of $SiO_2$, and 1–10 wt % of $Al_2O_3$.

It is confirmed from Table 7 that satisfactory results are obtained from the ZnO-base glasses (No. 45–50) with excellent permittivity $\in$ values ($\in$ =6.4 to 6.5). According to Examples No. 45–50, it is desirable that the glass is composed of 35–60 wt % of ZnO, 25–45 wt % of $B_2O_3$, 1–12 wt % of $SiO_2$, 1–10 wt % of $Al_2O_3$, 5 wt % or less of $K_2O$.

With regard to Example No. 47 that does not include $R_2O$ (in this case, $K_2O$), it is considered that similar performance will be obtained even if the composition shown in Table 7 is slightly changed in the following ranges: 30–60 wt % of ZnO, 30–50 wt % of $B_2O_3$, 1–10 wt % of $SiO_2$, and 1–10 wt % of $Al_2O_3$.

It is confirmed from Table 8 that satisfactory results are obtained from the ZnO—$Nb_2O_5$-base glasses (No. 51–54) with excellent permittivity $\in$ values ($\in$ 6.5 to 6.8). According to Examples No. 51–54, it is desirable that the glass is composed of 9–19 wt % of $Nb_2O_5$, 35–60 wt % of ZnO, 20–38 wt % of $B_2O_3$, 1–10.5 wt % of $SiO_2$, and 5 wt % or less of $Li_2O$.

With regard to Example No. 51 that does not include $R_2O$ (in this case, $Li_2O$), it is considered that similar performance will be obtained even if the composition shown in Table 8 is slightly changed in the following ranges: 9–20 wt % of $Nb_2O_5$, 35–60 wt % of ZnO, 25–40 wt % of $B_2O_3$, and 1–10 wt % of $SiO_2$.

As apparent from above, the permittivity $\in$ value in the Examples 1–54 is in a range of 6.0–6.9 or lower, which is as low as approximately half of the permittivity $\in$ value (being in a range of 11.0–12.9) of Comparative Examples 61–64 and 68–75 shown in Tables 11 and 12. As will be described later in detail, the performance of the Comparative Examples 61–67 is inferior to the Examples in terms of the loss factor tan δ or the yellowing.

In Examples No. 55–60 corresponding to the PDP of Embodiment 2 (PDP having a two-layered dielectric layer), the first dielectric layer is made of a PbO-base glass (No. 55–57) or one of a $SiO_2$-base glass (No. 58), a $Al_2O_3$-base glass (No. 59), and a ZnO-base glass (No. 60) which are made with the sputtering method, and the second dielectric layer is made of a ZnO-base glass (No. 55 and 57–60) or a $P_2O_5$—ZnO-base glass (No. 56). As is the case with Examples 1–54, the permittivity $\in$ value in each of the Examples 55–60 is lower than 7.

5-2. Panel Brightness and Panel Power Consumption

It is understood from the results shown in Tables 14–25 that in general, Examples 1–60 consume greatly reduced power compared with Comparative Examples 61–75 while maintaining almost the same performance as Comparative Examples 61–75 (power consumption of Examples 1–60 is 450–550 W while power consumption of Comparative Examples 61–75 is 830–1000 W).

With regard to the $\in$·tan δ value which is proportionate to the power loss w, even the highest value in Examples 1–60, including Examples 4, 20, 29, 43, 47 and 51 that do not contain $R_2O$ in the dielectric layer, does not reach 0.12 while in Comparative Examples 61–75, the value ranges from 0.140 to 0.750. It is understood from this that the PDPs of the Examples consume greatly reduced power and have excellent luminous efficiency. It is also found from the entire measurement results of Examples 1–60 that the composition of the glass for the dielectric layer of the present invention may be determined based-on whether the $\in$·tan δ value is 0.12 or lower or not.

Also, even the highest withstand voltage in Examples 1–60 is approximately 1.5 times the Comparative Examples. It is confirmed from this that Examples 1–60 with the above glass composition have excellent durability.

5-3. Transparency (Discoloring) of Dielectric Layer

It is confirmed from the results shown in Tables 14–22 that no yellowing was observed by naked eye and transparency of the glass is maintained excellently in each of Examples 1–60, while yellowing was observed in Comparative Examples 61–67 and 72–75. It is thought that the transparency contributes to the excellent panel brightness. Though yellowing was not observed in Comparative Examples 68–71, the permittivity $\in$ value of them is as high as 10.5–11.0, as described earlier.

It is thought that the yellowing occurs to the dielectric layer mainly because, as described earlier, the colloidal particles of Ag and Cu from bus lines reflect visible light. In the dielectric layer of the Examples, the generation of the colloidal particles is suppressed and the transparency is maintained. This is achieved by reducing the amount of $R_2O$ in the glass layer to 10 wt % or less to suppress the reduction reaction of Ag and Cu ions. In other words, it is desirable that the dielectric layer of the present invention contains ZnO (or ZnO and $P_2O_5$) and 10 wt % or less of $R_2O$ and that the permittivity $\in$ value is 7 or lower. However, the dielectric layer may not necessarily contain $R_2O$ since some Examples (e.g., No. 4, 20) not containing $R_2O$ shows excellent permittivity $\in$ values.

Note that, as the data of Comparative Examples 65–67 shows, the yellowing was observed in the ZnO-base glass or ZnO—$P_2O_5$-base glass that contains more than 10 wt % of $R_2O$ (e.g. $Na_2O$). It should be noted here that Comparative Example 67 was manufactured based on the PDP disclosed in Japanese Laid-Open Patent Application No. 8-77930. The yellowing observed in Comparative Examples 65–67 was stronger than the yellowing observed in the other Comparative Examples.

6. Others

In the above embodiments or examples, the present invention is applied to PDPs conforming to the VGA specifications. However, the present invention is not limited to this standard, but can be applied to PDPs conforming to other standards.

The discharge gas used in the PDP of the present invention is not limited to Ne—Xe-base gas. Other discharge gases will provide the same effects.

INDUSTRIAL APPLICABILITY

The above plasma display panel of the present invention is characterized by a small power consumption. The invention is therefore useful in large-screen high-definition TV or the like which consumes relatively a large amount of power conventionally.

What is claimed is:

1. A plasma display panel in which a space between a first plate and a second plate facing each other is filled with a discharge gas, a plurality of pairs of display electrodes made of Ag are formed on a surface of the first plate facing the second plate, and the surface of the first plate is covered with a dielectric layer covering the plurality of pairs of display electrodes, characterized in that:
the dielectric layer is made of a glass that contains at least ZnO and 10 wt % or less of $R_2O$ and does not substantially contain PbO and $Bi_2O_3$, and a product of permittivity $\epsilon$ and loss factor tan $\delta$ of the dielectric layer is 0.12 or less, wherein R is selected from a group consisting of Rb, Cs, Cu, and Ag.

2. The plasma display panel of claim 1, wherein the permittivity $\epsilon$ of the dielectric layer is 7 or less.

3. The plasma display panel of claim 1, wherein the dielectric layer is composed of a ZnO-base glass which contains 20–44 wt % of ZnO, 38–55 wt % of $B_2O_3$, 5–12 wt % of $SiO_2$, 10 wt % or less of $R_2O$, and 10 wt % or less of MO, and the permittivity $\epsilon$ of the dielectric layer is 7 or less, wherein R is selected from a group consisting of Rb, Cs, Cu, and Ag, and M is selected from a group consisting of Ca, Sr, Co, and Cr.

4. The plasma display panel of claim 1, wherein the dielectric layer is composed of a ZnO-base glass which contains 20–43 wt % of ZnO, 38–55 wt % of $B_2O_3$, 5–12 wt % of $SiO_2$, 1–10 wt % of $Al_2O_3$, 10 wt % or less of $R_2O$, and 10 wt % or less of MO, and the permittivity $\epsilon$ of the dielectric layer is 7 or less, wherein R is selected from a group consisting of Rb, Cs, Cu, and Ag, and M is selected from a group consisting of Ca, Sr, Co, and Cr.

5. A plasma display panel in which a space between a first plate and a second plate facing each other is filled with a discharge gas, a plurality of pairs of display electrodes made of Ag are formed on a surface of the first plate facing the second plate, and the surface of the first plate is covered with a dielectric layer covering the plurality of pairs of display electrodes, characterized in that:
the dielectric layer is made of a glass which is composed of 20–30 wt % of $P_2O_5$, 30–40 wt % of ZnO, 30–45 wt % of $B_2O_3$, and 1–10 wt % of $SiO_2$ and a product of permittivity $\epsilon$ and loss factor tan $\delta$ of the dielectric layer is 0.12 or less.

6. A plasma display panel in which a space between a first plate and a second plate facing each other is filled with a discharge gas, a plurality of pairs of display electrodes made of Ag are formed on a surface of the first plate facing the second plate, and the surface of the first plate is covered with a dielectric layer covering the plurality of pairs of display electrodes, characterized in that:
the dielectric layer is made of a glass which is composed of 9–20 wt % of $Nb_2O_5$, 35–60 wt % of ZnO, 25–40 wt % of $B_2O_3$, and 1–10 wt % of $SiO_2$, and a product of permittivity $\epsilon$ and loss factor tan $\delta$ of the dielectric layer is 0.12 or less.

7. A plasma display panel in which a space between a first plate and a second plate facing each other is filled with a discharge gas, a plurality of pairs of display electrodes made of Ag are formed on a surface of the first plate facing the second plate, and the surface of the first plate is covered with a dielectric layer covering the plurality of pairs of display electrodes, characterized in that:
the dielectric layer is composed of
a first dielectric layer which either is a thin film of $SiO_2$, $Al_2O_3$ or ZnO or is made of a glass containing at least PbO or $Bi_2O_3$ and covers the plurality of pairs of display electrodes, and
a second dielectric layer made of a glass in which a product of permittivity $\epsilon$ and loss factor tan $\delta$ is 0.12 or less, the second dielectric layer covering the first dielectric layer.

8. The plasma display panel of claim 7, wherein the second dielectric layer is made of a glass that contains at least ZnO and 10 wt % or less of $R_2O$ and does not substantially contain PbO and $Bi_2O_3$, wherein R is selected from a group consisting of Li, Na, K, Rb, Cs, Cu, and Ag.

9. The plasma display panel of claim 7, wherein a total thickness of the dielectric layer is 40 $\mu$m or less, and a thickness of the first dielectric layer is half of the total thickness or less.

10. A plasma display panel in which a space between a first plate and a second plate facing each other is filled with a discharge gas, a plurality of pairs of display electrodes made of Ag are formed on a surface of the first plate facing the second plate, and the surface of the first plate is covered with a dielectric layer covering the plurality of pairs of display electrodes, characterized in that:
the dielectric layer is made of a glass that contains 10–25 wt % of $P_2O_5$, 20–35 wt % of ZnO, 30–40 wt % of $B_2O_3$, 5–12 wt % of $SiO_2$, 10 wt % or less of $R_2O$, and 10 wt % or less of DO, and does not substantially contain PbO and $Bi_2O_3$, and the permittivity $\epsilon$ of the dielectric layer is 7 or less and a product of permittivity $\in$ and loss factor tan $\delta$ of the dielectric layer is 0.12 or less, wherein R is selected from a group consisting of K, Rb, Cs, Cu, and Ag and wherein D is selected from a group consisting of Mg, Ca, Ba, Sr, Co, Cr, and Ni.

11. A plasma display panel in which a space between a first plate and a second plate facing each other is filled with a discharge gas, a plurality of pairs of display electrodes made of Ag are formed on a surface of the first plate facing the second plate, and the surface of the first plate is covered with a dielectric layer covering the plurality of pairs of display electrodes, characterized in that:
the dielectric layer is composed of a $ZnO$—$P_2O_5$-base glass which contains 42–50 wt % of $P_2O_5$, 35–50 wt % of ZnO, 7–14 wt % of $Al_2O_3$, 5 wt % or less of $Na_2O$, and 10 wt % or less and does not substantially contain PbO and $Bi_2O_3$, and the permittivity $\epsilon$ of the dielectric layer is 7 or less and a product of permittivity $\epsilon$ and loss factor tan δ of the dielectric layer is 0.12 or less, wherein R is selected from a group consisting of K, Rb, Cs, Cu, and Ag.

12. A plasma display panel in which a space between a first plate and a second plate facing each other is filled with a discharge gas, a plurality of pairs of display electrodes made of Ag are formed on a surface of the first plate facing the second plate, and the surface of the first plate is covered with a dielectric layer covering the plurality of pairs of display electrodes, characterized in that:

the dielectric layer is composed of a ZnO-base glass which contains 1–15 wt % of ZnO, 20–40 wt % of $B_2O_3$, 10–30 wt % of $SiO_2$, 5–25 wt % of $Al_2O_3$, 3–10 wt % of $Li_2O$, 2–15 wt % of MO, and 10 wt % or less of $R_2O$ and does not substantially contain PbO and $Bi_2O_3$, and the permittivity ε of the dielectric layer is 7 or less and a product of permittivity ε and loss factor tan δ of the dielectric layer is 0.12 or less, wherein R is selected from a group consisting of K, Rb, Cs, Cu, and Ag and wherein M is selected from a group consisting of Mg, Ca, Ba, Sr, Co, and Cr.

13. A plasma display panel in which a space between a first plate and a second plate facing each other is filled with a discharge gas, a plurality of pairs of display electrodes made of Ag are formed on a surface of the first plate facing the second plate, and the surface of the first plate is covered with a dielectric layer covering the plurality of pairs of display electrodes, characterized in that:

the dielectric layer is composed of a ZnO-base glass which contains 35–60 wt % of ZnO, 25–45 wt % of $B_2O_3$, 1–10.5 wt % of $SiO_2$, 1–10 wt % of $Al_2O_3$, 5 wt % or less of $Na_2O$, and 10 wt % or less of $R_2O$ and does not substantially contain PbO and $Bi_2O_3$, and the permittivity ε of the dielectric layer is 7 or less and a product of permittivity ε and loss factor tan δ of the dielectric layer is 0.12 or less, wherein R is selected from a group consisting of K, Rb, Cs, Cu, and Ag.

14. A plasma display panel in which a space between a first plate and a second plate facing each other is filled with a discharge gas, a plurality of pairs of display electrodes made of Ag are formed on a surface of the first plate facing the second plate, and the surface of the first plate is covered with a dielectric layer covering the plurality of pairs of display electrodes, characterized in that:

the dielectric layer is composed of a $ZnO$—$Nb_2O_5$-base glass which contains 9–19 wt % of $Nb_2O_5$, 35–60 wt % of ZnO, 20–38 wt % of $B_2O_3$, 1–10.5 wt % of $SiO_2$, 5 wt % or less of $Li_2O$, and 10 wt % or less of $R_2O$ and does not substantially contain PbO and $Bi_2O_3$, and the permittivity ε of the dielectric layer is 7 or less and a product of permittivity ε and loss factor tan δ of the dielectric layer is 0.12 or less, wherein R is selected from a group consisting of K, Rb, Cs, Cu, and Ag.

15. A plasma display panel in which a space between a first plate and a second plate facing each other is filled with a discharge gas, a plurality of pairs of display electrodes made of Ag are formed on a surface of the first plate facing the second plate, and the surface of the first plate is covered with a dielectric layer covering the plurality of pairs of display electrodes, characterized in that:

the dielectric layer is composed of a ZnO-base glass which contains 35–60 wt % of ZnO, 25–45 wt % of $B_2O_3$, 1–12 wt % of $SiO_2$, 1–10 wt % of $Al_2O_3$, 5 wt % or less of $K_2O$, and 10 wt % or less of $R_2O$ and does not substantially contain PbO and $Bi_2O_3$, and the permittivity ε of the dielectric layer is 7 or less and a product of permittivity ε and loss factor tan δ of the dielectric layer is 0.12 or less, wherein R is selected from a group consisting of Rb, Cs, Cu, and Ag.

* * * * *

UNITED STATES PATENT AND TRADEMARK OFFICE
CERTIFICATE OF CORRECTION

PATENT NO. : 6,897,610 B1
DATED : May 24, 2005
INVENTOR(S) : Aoki et al.

It is certified that error appears in the above-identified patent and that said Letters Patent is hereby corrected as shown below:

Column 36,
Line 65, after "less", -- $R_2O$ -- should be inserted.

Signed and Sealed this

Thirtieth Day of May, 2006

JON W. DUDAS
*Director of the United States Patent and Trademark Office*